US012747168B2

(12) United States Patent
Wada et al.

(10) Patent No.: US 12,747,168 B2
(45) Date of Patent: Sep. 29, 2026

(54) FLUID STERILIZATION DEVICE

(71) Applicant: TOYODA GOSEI CO., LTD., Kiyosu (JP)

(72) Inventors: Satoshi Wada, Kiyosu (JP); Takafumi Hayashi, Kiyosu (JP); Tomoyuki Suzuki, Kiyosu (JP); Kazuya Tachibana, Kiyosu (JP)

(73) Assignee: TOYODA GOSEI CO., LTD., Kiyosu (JP)

( * ) Notice: Subject to any disclaimer, the term of this patent is extended or adjusted under 35 U.S.C. 154(b) by 382 days.

(21) Appl. No.: 18/514,904

(22) Filed: Nov. 20, 2023

(65) Prior Publication Data

US 2024/0199447 A1 Jun. 20, 2024

(30) Foreign Application Priority Data

Dec. 15, 2022 (JP) ................................ 2022-200136

(51) Int. Cl.
*C02F 1/32* (2023.01)

(52) U.S. Cl.
CPC ........ *C02F 1/32* (2013.01); *C02F 2201/3222* (2013.01); *C02F 2201/3228* (2013.01)

(58) Field of Classification Search
CPC ........ C02F 1/32; C02F 1/325; C02F 2201/32; C02F 2201/3222; C02F 2201/3228; C02F 2303/04
See application file for complete search history.

(56) References Cited

U.S. PATENT DOCUMENTS

| | | | |
|---|---|---|---|
| D670,410 S | 11/2012 | Van de Ven et al. |
| 8,858,032 B2 | 10/2014 | Van de Ven et al. |
| 9,617,171 B2 | 4/2017 | Rajagopalan et al. |
| 10,134,963 B2 | 11/2018 | Lu et al. |
| 10,495,295 B2 | 12/2019 | Van de Ven et al. |

(Continued)

FOREIGN PATENT DOCUMENTS

| | | |
|---|---|---|
| CN | 106848031 A | 6/2017 |
| CN | 208087261 U | 11/2018 |

(Continued)

OTHER PUBLICATIONS

Tanaka, Takaaki et al—CN 208087261 U machine translation—Nov. 13, 2018 (Year: 2018).*

(Continued)

*Primary Examiner* — Bradley R Spies
(74) *Attorney, Agent, or Firm* — MCGINN INTELLECTUAL PROPERTY LAW GROUP, PLLC

(57) ABSTRACT

A small and lightweight fluid sterilization device is provided. The fluid sterilization device includes a light source unit configured to emit an ultraviolet ray, and a channel space which the ultraviolet ray emitted from the light source unit enters, the channel space being a space through which a fluid flows. The light source unit includes a mounting substrate, and an LED package mounted on the mounting substrate. The LED package includes a light emitting element configured to emit the ultraviolet ray, and a lid portion transmitting the ultraviolet ray from the light emitting element, disposed in contact with the channel space, and configured to conduct heat conducted from the light emitting element to a fluid flowing through the channel space.

20 Claims, 14 Drawing Sheets

(56) References Cited

U.S. PATENT DOCUMENTS

| | | | |
|---|---|---|---|
| 10,543,291 | B2 | 1/2020 | Takeguchi et al. |
| 11,565,007 | B2 | 1/2023 | Jeong et al. |
| 11,904,062 | B2 | 2/2024 | Jeong et al. |
| 12,343,439 | B2 | 7/2025 | Jeong et al. |
| 2010/0103678 | A1 | 4/2010 | Van de Ven et al. |
| 2014/0362582 | A1 | 12/2014 | Van de Ven et al. |
| 2016/0083272 | A1 | 3/2016 | Rajagopalan et al. |
| 2017/0162767 | A1 | 6/2017 | Lu et al. |
| 2018/0244543 | A1* | 8/2018 | Ochi ......................... C02F 1/44 |
| 2019/0358356 | A1 | 11/2019 | Takeguchi et al. |
| 2021/0393817 | A1 | 12/2021 | Jeong et al. |
| 2023/0165985 | A1 | 6/2023 | Jeong et al. |
| 2024/0181100 | A1 | 6/2024 | Jeong et al. |
| 2025/0303011 | A1 | 10/2025 | Jeong et al. |

FOREIGN PATENT DOCUMENTS

| | | | |
|---|---|---|---|
| CN | 209045610 | U | 6/2019 |
| CN | 110740758 | A | 1/2020 |
| JP | 2007-061730 | A | 3/2007 |
| JP | 2009-260050 | A | 11/2009 |
| JP | 2012-507115 | A | 3/2012 |
| JP | 2015-174026 | A | 10/2015 |
| JP | 2016-523594 | A | 8/2016 |
| JP | 2018-118201 | A | 8/2018 |
| JP | 2018-161247 | A | 10/2018 |
| JP | 2020-103629 | A | 7/2020 |
| JP | 2021-041382 | A | 3/2021 |
| JP | 2022-069596 | A | 5/2022 |
| KR | 101931632 | B1 | 12/2018 |
| WO | 2018/143304 | A1 | 8/2018 |

OTHER PUBLICATIONS

Sakurai, Kimito et al—JP 2020103629 A machine translation—Jul. 9, 2020 (Year: 2020).*

Ao, Koji et al—JP 2021041382 A machine translation—Mar. 18, 2021 (Year: 2021).*

Chinese Office Action dated Nov. 28, 2025 in Chinese Patent Application No. 202311708795.7 with machine English translation.

Japanese Office Action dated Jun. 10, 2025 in Japanese Patent Application No. 2002-200136 with English Machine Translation.

* cited by examiner

FLUID STERILIZATION DEVICE

CROSS-REFERENCE

This application claims priority to Japanese patent application no. 2022-200136 filed on Dec. 15, 2022, the contents of which are fully incorporated herein by reference.

BACKGROUND OF THE INVENTION

Technical Field

The present invention relates to a fluid sterilization device.

Background Art

A sterilization device that kills bacteria and viruses in flowing water by irradiation with ultraviolet rays is known. A mercury lamp is widely used as a light source. The mercury lamp uses mercury, and thus has strong toxicity and a large environmental load, which is a problem. There is also a problem that a sterilization device using the mercury lamp becomes large. Accordingly, replacement of the mercury lamp with an ultraviolet LED is in progress.

JP-A-2016-523594, JP-A-2022-69596, WO-A1-2018/143304, and JP-A-2021-41382 disclose a water sterilization device using an ultraviolet LED. JP-A-2016-523594, JP-A-2022-69596, and WO-A1-2018/143304 show a configuration in which a window through which ultraviolet rays can pass is provided at one end of a pipe through which water is conducted, and an LED package that emits ultraviolet rays is disposed through the window.

It is also known that the sterilization efficiency is improved by using polytetrafluoroethylene (PTFE) having a high ultraviolet reflectance as a channel tube and reflecting ultraviolet rays inside the channel tube. JP-A-2016-523594 and JP-A-2022-69596 show a channel tube in which a PTFE material is provided on an inner surface of the tube made of a resin material, a metal material, or the like. WO-A1-2018/143304 shows a channel tube having an inside made of an ultraviolet transmitting member and an outside made of PTFE.

JP-A-2021-41382 describes a structure in which a metal pedestal protrudes inside a channel tube, a mounting substrate on which an ultraviolet light emitting element is mounted is disposed on the pedestal, a metal cap covering the ultraviolet light emitting element is provided, and an ultraviolet transmission window is provided in the cap. In addition, it is described that the pedestal and the cap are exposed to the channel, and heat can be released from the pedestal and the cap to a liquid.

SUMMARY OF THE INVENTION

In a sterilization device as disclosed in JP-A-2016-523594, JP-A-2022-69596, and WO-A1-2018/143304, conventionally, heat from an LED is dissipated from a heat sink to the air by connecting the heat sink to a mounting substrate of the LED. However, when the heat sink is provided, the size of the device is increased, and the weight of the device is also increased. The pedestal of JP-A-2021-41382 also corresponds to a heat sink, and there is concern about an increase in weight and an increase in size.

In addition, a window separating the channel tube side and the LED package side is required to have high ultraviolet transmittance and pressure resistance that can withstand water pressure, which leads to a limitation on usable materials. In the sterilization device of each of JP-A-2016-523594, JP-A-2022-69596, and WO-A1-2018/143304, water vapor is generated by heat from the LED, the LED package side of the window is fogged, the ultraviolet transmittance is reduced, so that the sterilization efficiency may be deteriorated.

The present invention has been made in view of such a background, and an object thereof is to provide a small and lightweight fluid sterilization device.

One aspect of the present invention is a fluid sterilization device including:

- a light source unit configured to emit an ultraviolet ray; and
- a channel space which the ultraviolet ray from the light source unit enters, the channel space being a space through which a fluid flows, in which
- the light source unit includes
  - a mounting substrate, and
  - an LED package mounted on the mounting substrate, the LED package includes
  - a light emitting element configured to emit the ultraviolet ray, and
  - a lid portion transmitting the ultraviolet ray from the light emitting element, disposed in contact with the channel space, and configured to conduct heat conducted from the light emitting element to a fluid flowing through the channel space.

In the fluid sterilization device, the lid portion of the LED package is exposed to the channel space. This makes it possible to efficiently dissipate heat from the lid portion to the fluid, and there is no need to provide a heat sink. As a result, it is possible to reduce the size and weight of the fluid sterilization device.

As described above, according to the above aspect, it is possible to provide a small and lightweight fluid sterilization device.

DETAILED DESCRIPTION OF PREFERRED EMBODIMENTS

Figure 1:
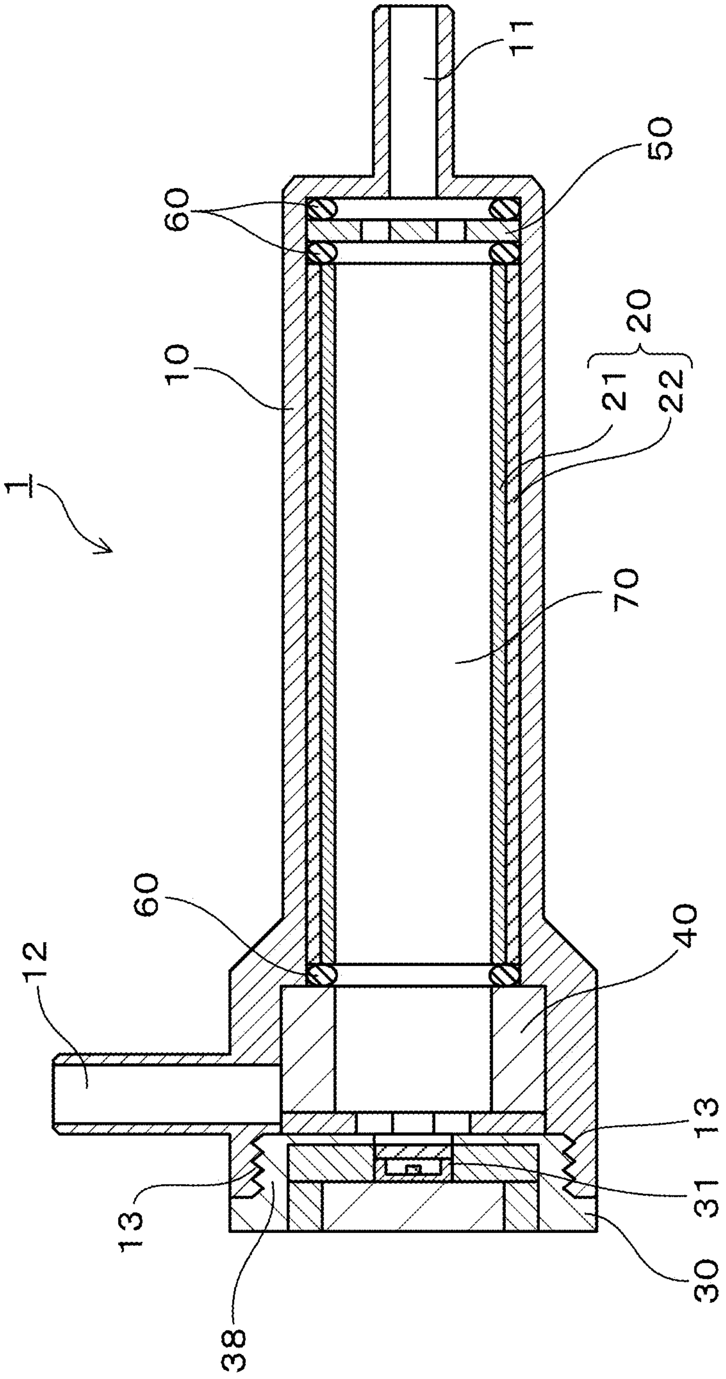
FIG. 1 is a cross-sectional view illustrating a configuration of a fluid sterilization device according to a first embodiment, the cross-sectional view being taken along a plane including an axis.

A fluid sterilization device includes a light source unit that emits ultraviolet rays, and a channel space that the ultraviolet rays from the light source unit enters, the channel space being a space through which a fluid flows. The light source unit includes a mounting substrate and an LED package mounted on the mounting substrate. The LED package includes a light emitting element that emits ultraviolet rays, and a lid portion that transmits ultraviolet rays from the light emitting element, is disposed to be in contact with the channel space, and is configured to conduct heat conducted from the light emitting element to a fluid flowing through the channel space.

The LED package may include a package case including an internal space and an opening portion through which the internal space opens, the package case accommodating the light emitting element in the internal space, having a bottom surface side mounted on the mounting substrate, and being configured to conduct heat generated from the light emitting element to the opening side. The lid portion may seal the opening portion of the package case, and heat from the light emitting element may be conducted to the lid portion through the package case.

The package case may be disposed in contact with the channel space and configured to conduct heat conducted from the light emitting element to the fluid flowing through the channel space.

The LED package may include a plate-shaped substrate on which the light emitting element is placed, and the lid portion may include an internal space and an opening portion through which the internal space opens. The lid portion may be disposed on the substrate with the opening portion on the substrate side and the light emitting element positioned in the internal space, and may be configured to conduct heat conducted from the light emitting element through the substrate to the fluid flowing through the channel space.

The internal space may be filled with a sealing member, and the sealing member may be a material that transmits ultraviolet rays and has a higher thermal conductivity than air.

The light source unit may further include a seal portion that covers the mounting substrate and does not cover the lid portion, and a light source case that accommodates the mounting substrate and the LED package and has an opening through which at least the LED package is exposed. The seal portion may be formed of a polymer material containing thermally conductive particles or thermally conductive fibers, may be in contact with the package case, and may be in contact with an inner surface of the light source case. The light source case may be disposed in contact with the channel space and may be configured to conduct heat of the light emitting element conducted through the package case and the seal portion to the fluid flowing through the channel space.

The fluid sterilization device may further include a channel tube that is formed in a tubular shape and has an inside serving as the channel space, and the light source unit may be disposed at one end of the channel tube in the axial direction to close the one end of the channel tube in the axial direction.

The fluid sterilization device may further include a channel tube that is formed in a tubular shape and has an inside serving as the channel space, and the light source unit may have a through hole disposed at one end of the channel tube in the axial direction through which a liquid can flow between a channel tube side and a side opposite to the channel tube. The fluid sterilization device can be configured in a straight pipe type.

The fluid sterilization device may further include a channel tube that is formed in a tubular shape and has an inside serving as the channel space, a through hole may be provided in the side surface of the channel tube, and the light source unit may be fitted into the through hole.

First Embodiment

1. Outline of Configuration of Fluid Sterilization Device 1

Figure 2:
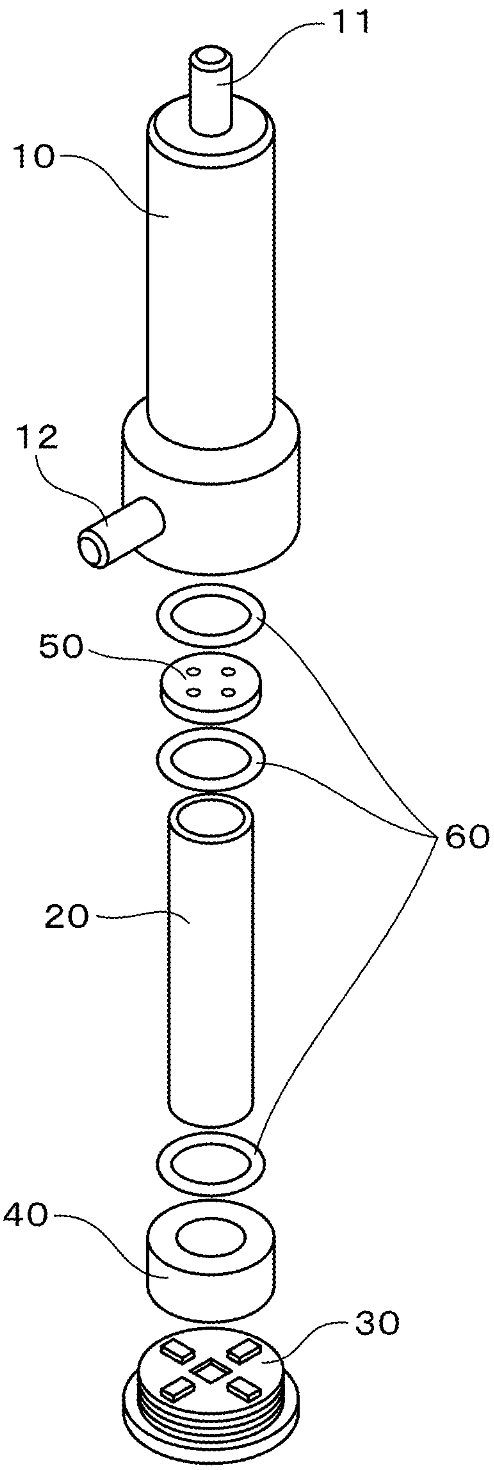
FIG. 2 is an exploded view of the fluid sterilization device according to the first embodiment.

FIG. 1 is a cross-sectional view illustrating a configuration of a fluid sterilization device 1 according to a first embodiment, the cross-sectional view being taken along a plane including an axis of the fluid sterilization device 1. FIG. 2 is an exploded view of the fluid sterilization device 1 according to the first embodiment. As illustrated in FIGS. 1 and 2, the fluid sterilization device 1 according to the first embodiment includes a housing 10, a channel tube 20, a light source unit 30, a spacer 40, and a plate 50. The light source unit 30 includes an LED package 31, a mounting substrate 32, a seal portion 33, and a light source case 34. The LED package 31 includes an LED 35, a package case 36, and a lid portion 37.

The fluid sterilization device 1 according to the first embodiment is a device that causes water to flow into the channel tube 20 and the spacer 40 and sterilizes the water by irradiating the water with ultraviolet rays. The internal spaces of the channel tube 20 and the spacer 40 are a channel space 70 (a space through which water flows at the time of sterilization, and an area irradiated with ultraviolet rays). An object to be sterilized may be any liquid such as oil or alcohol in addition to water. A state in which a solid is mixed with a liquid may be employed as long as the mixture has fluidity.

2. Details of Components of Fluid Sterilization Device 1

Next, components of the fluid sterilization device 1 will be described in detail.

The housing 10 has a tubular shape, and is provided with an inlet 11 on one end surface in the axial direction and an outlet 12 on a side surface of the tube in the vicinity of the other end surface. The housing 10 is made of, for example, black polypropylene (PP). Inside the housing 10, the plate 50, the channel tube 20, and the spacer 40 are coaxially arranged in this order from the inlet 11 side.

The other end surface of the housing 10 is open. A thread 13 is provided on the inner peripheral surface of the tube in the vicinity of the other end surface. The light source unit 30 is fitted and screwed into the other end surface of the housing 10, and the other end surface of the housing 10 is sealed by the light source unit 30.

O-rings 60 are provided between the housing 10 and the plate 50, between the plate 50 and the channel tube 20, and between the channel tube 20 and the spacer 40, respectively, to prevent water from leaking from gaps between the respective members. The water flowing through the inlet 11 passes through the plate 50, the channel tube 20, and the spacer 40, is irradiated with ultraviolet rays by the light source unit 30, and then is discharged from the outlet 12.

The channel tube 20 has a cylindrical shape and includes a transparent tube 21 and a reflector 22 provided in contact with an outer peripheral surface of the transparent tube 21. An outer peripheral surface of the reflector 22 is in contact with the inner peripheral surface of the housing 10. The reflector 22 has a high reflectance of ultraviolet rays, and can efficiently irradiate water flowing through the channel tube 20 with ultraviolet rays by reflecting ultraviolet rays on the side surface of the channel tube 20.

The transparent tube 21 is a cylindrical tube made of quartz, and allows water to be sterilized to flow inside the tube.

The material of the transparent tube 21 is not limited to quartz, and may be any material as long as it transmits ultraviolet rays and has low absorptivity. For example, sapphire, ultraviolet-transmissive glass, fluororesin, acrylic resin, or the like may be used. In particular, a material having a small refractive index difference with water is preferable, and in that respect, quartz in the first embodiment is suitable. For example, a material having a refractive index of 1.3 to 1.5 is preferable.

The transparent tube 21 may have any thickness as long as it has strength with which the tube can withstand water pressure and ultraviolet transparency. The thickness is, for example, 0.4 mm to 3 mm. In a case of normal incidence, a material and a thickness which achieve an ultraviolet transmittance of 80% or more are preferable.

The inner peripheral surface of the transparent tube 21 is preferably as flat as possible, and for example, a root mean square height (RMS) is preferably 1 μm or less. This makes bacteria less likely to adhere to irregularities on the inner peripheral surface and makes dirt less likely to adhere to the inner peripheral surface, so that a decrease in sterilization efficiency can be suppressed. In addition, a water-repellent film of a fluororesin or the like may be formed on the inner peripheral surface of the transparent tube 21 to make the inner peripheral surface of the transparent tube 21 water-repelling, leading to prevention of dirt on the inner peripheral surface of the transparent tube 21.

The reflector 22 is provided in contact with the outer peripheral surface of the transparent tube 21. The reflector 22 reflects ultraviolet rays transmitted through the transparent tube 21 and directed to the outside.

The reflector 22 is formed by winding an unsintered polytetrafluoroethylene (PTFE) film on the outer peripheral surface of the transparent tube 21 one or more times. That is, the reflector 22 is formed by laminating the unsintered PTFE film on the transparent tube 21 (laminate). The unsintered PTFE film is a film in a sheet shape or a tape shape obtained by rolling PTFE fine powder in an unsintered state. The PTFE fine powder is white powder in which fine particles of PTFE are aggregated.

As the PTFE fine powder, for example, powder for paste extrusion molding (II-1 or II-2) specified in JIS K 6896:1995 can be used. II-1 satisfies the following characteristics: apparent density (g/ml) of 0.50±0.15, moisture (%) of 0.04 or less, high temperature volatile content (%) of 0.1 or less, melting point (° C.) of 327±10, specific gravity of 2.13 to 2.20, tensile strength (MPa) of 17.6 or more, and elongation (%) of 200 or more. These characteristics are measured in accordance with JIS K 6896:1995. In addition, II-2 has the same characteristics as II-1 except that the specific gravity is 2.18 to 2.28.

As the unsintered PTFE film, an unsintered film which is produced using the powder for paste extrusion molding specified in JIS K 6896:1995 and contains no additive can be used. In particular, an unsintered PTFE tape specified in JIS K 6885:2005 can be used. The unsintered PTFE tape specified in JIS K 6885:2005 satisfies the following qualities: apparent density (g/cm$^3$) of 1.0 or more, tensile strength (MPa) of 7.0 or more, elongation (%) of 20 or more, volatilization loss (%) of 0.5 or less, and being nonflammable. These qualities are measured in accordance with JIS K 6885:2005.

The unsintered PTFE film is unsintered and thus has a self-fusion property.

Accordingly, when the unsintered PTFE film is wound around the transparent tube 21, a gap between the transparent tube 21 and the unsintered PTFE film and a gap between the unsintered PTFE film and the unsintered PTFE film are eliminated. This makes it possible to closely attach and fix the unsintered PTFE film to the transparent tube 21 without using an adhesive or the like, so that the reflector 22 can be easily formed.

Note that an air layer may partly remain between the transparent tube 21 and the unsintered PTFE film or between the unsintered PTFE film and the unsintered PTFE film. Even if the air layer remains, there is reflection due to a refractive index difference at an interface with the air layer, and the ultraviolet rays transmitted through the air layer are reflected by the unsintered PTFE film, so that the ultraviolet reflectance of the reflector 22 is not significantly affected. Accordingly, when the unsintered PTFE film is wound around the transparent tube 21 to form the reflector 22, it is not necessary to wind the unsintered PTFE film neatly in such a manner that no air layer remains, and the reflector 22 can be easily formed.

The reflector 22 has high reflectance to ultraviolet rays. This is for the following reason. First, PTFE itself is a material having high ultraviolet reflectance. Second, due to the self-fusion property of the unsintered PTFE film, no gap is generated between the transparent tube 21 and the unsintered PTFE film and between the unsintered PTFE film and the unsintered PTFE film. Third, the PTFE fine powder becomes fibrous when a shear stress is applied, and thus particles of the unsintered PTFE film become fibrous. As a result, the density of the particles increases.

The thickness of the reflector 22 is preferably 0.02 mm or more, and the number of windings of the unsintered PTFE film should be set to have such a thickness. This can make the reflectance equal to or higher than that of barium sulfate which is a typical material as a reflective material. In particular, the thickness of the reflector 22 is preferably 0.2 mm or more. This makes it possible to achieve ultraviolet reflectance equal to or higher than that in a case where the channel tube 20 is made of PTFE bulk having a thickness of 8 mm. The upper limit of the thickness of the reflector 22 is not particularly limited, but the ultraviolet reflectance becomes saturated as the thickness increases. Thus, the thickness is preferably 2 mm or less. The thickness of the reflector 22 may be smaller than the thickness of the transparent tube 21. The thickness and width of the unsintered PTFE film may be arbitrary, but may be values specified in JIS K 6885:2005.

The O-rings 60 are disposed at both ends of the channel tube 20, respectively. This can prevent water from entering a gap between the outer peripheral surface of the transparent tube 21 and the inner peripheral surface of the housing 10, more specifically, a gap between the outer peripheral surface of the transparent tube 21 and the inner peripheral surface of the reflector 22, and a gap between the outer peripheral surface of the reflector 22 and the inner peripheral surface of the housing 10.

The light source unit 30 has a columnar shape, and a thread 38 is provided on a side surface of the column (a side surface of the light source case 34 described below). The thread 38 corresponds to the thread 13 of the housing 10. The light source unit 30 is fitted into the open end surface of the housing 10, and the thread 38 and the thread 13 are fitted and screwed into each other. The light source unit 30 is disposed at one end of the channel tube 20 in the axial direction with the spacer 40 interposed therebetween.

The light source unit 30 emits ultraviolet rays, and the ultraviolet rays enter the spacer 40 and the channel tube 20 from one end of the spacer 40. This makes it possible to irradiate water flowing through the spacer 40 and the channel tube 20 with ultraviolet rays to sterilize the water. A detailed configuration of the light source unit 30 will be described below.

The spacer 40 is disposed between the channel tube 20 and the light source unit 30. The spacer 40 is a cylindrical tube made of PTFE, and is disposed coaxially with the channel tube 20. The spacer 40 is provided to efficiently reflect an ultraviolet ray having a large angle with respect to the axis among the ultraviolet rays emitted from the light source unit 30, thereby enhancing the irradiation efficiency of the ultraviolet rays with respect to the water.

The plate 50 is disposed between the inlet 11 of the housing 10 and the channel tube 20. The plate 50 has a disk shape and is disposed coaxially with the channel tube 20. The plate 50 is made of PTFE. PTFE having high ultraviolet reflectance is used to reflect ultraviolet rays reaching the end surface of the channel tube 20 on the inlet 11 side and return the ultraviolet rays to the inside of the channel tube 20, thereby enhancing the irradiation efficiency of ultraviolet rays with respect to water. The plate 50 is provided with a plurality of through holes. The water flowing from the inlet 11 passes through the plurality of through holes of the plate 50 to be dispersed, and then flows into the channel tube 20.

Note that although the fluid sterilization device 1 according to the first embodiment has a cylindrical shape, the fluid sterilization device 1 may have any shape as long as water can flow therethrough. For example, the fluid sterilization device 1 may be formed in a tubular shape such as a square cylindrical shape.

3. Details of Components of Light Source Unit 30

Next, a configuration of the light source unit 30 will be described in detail with reference to the drawings.

Figure 3:
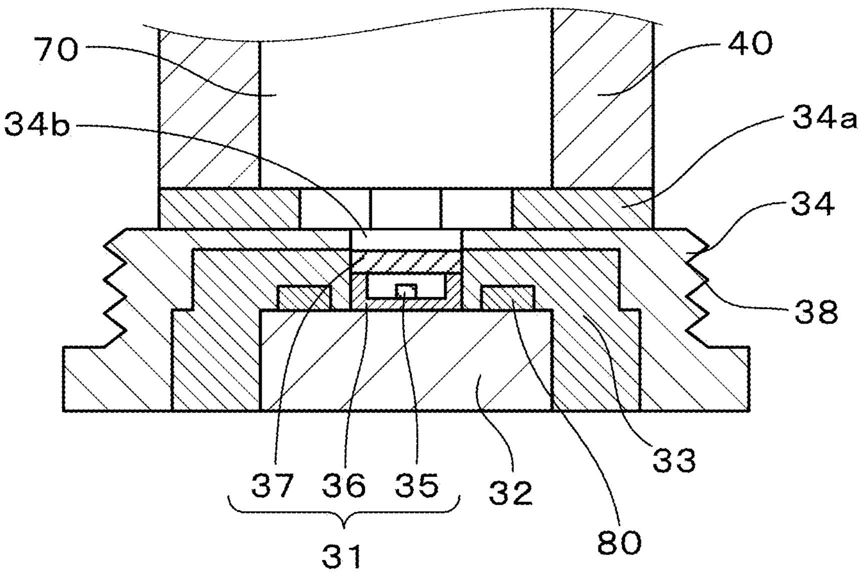
FIG. 3 is a cross-sectional view illustrating a configuration of a light source unit, the cross-sectional view being taken along a plane including an axis.

FIG. 3 is a cross-sectional view illustrating a configuration of the light source unit 30, the cross-sectional view being taken along a plane including an axis of the light source unit 30. As illustrated in FIG. 3, the light source unit 30 has a columnar shape and includes the LED package 31, the mounting substrate 32, the seal portion 33, and the light source case 34.

The LED package 31 is mounted on the mounting substrate 32. The LED package 31 includes the light emitting element (LED) 35, the package case 36 that houses the LED 35, and the lid portion 37 that seals the package case 36 and transmits ultraviolet rays.

The LED 35 is a light emitting element that emits ultraviolet rays. A wavelength of the ultraviolet rays is preferably 250 nm to 285 nm, at which sterilization efficiency with respect to water is high. A plurality of LEDs 35 may be provided in one LED package 31.

The package case 36 has a box shape such as a rectangular parallelepiped or a cylinder with an opened upper portion. Two electrodes are formed on an inner bottom surface and an outer bottom surface of the box, respectively, and the electrodes are connected between the inner side and the outer side. The outer bottom surface of the package case 36 is mounted on the mounting substrate 32, and the electrode on the outer bottom surface is connected to a circuit of the mounting substrate 32. The LED 35 is housed inside the package case 36, and the LED 35 is disposed on the inner bottom surface of the box to be connected to the two electrodes. The shape of the package case 36 is not limited to the box shape, and may be any shape as long as it has an internal space for housing the LED 35 and an opening where the internal space opens.

The package case 36 is made of a ceramic. In particular, ceramics such as aluminum nitride or aluminum oxide having high ultraviolet reflectance and high thermal conductivity are preferable. Alternatively, a metal having high thermal conductivity such as Cu or Al may be used. Further, the package case 36 may be formed of a material having a thermal conductivity higher than the thermal conductivity of the mounting substrate 32. This makes it possible to more efficiently conduct heat from the LED 35 to the lid portion 37 through the package case 36, so that heat dissipation efficiency can be improved. For the same reason, the package case 36 is preferably formed of a ceramic or a metal having a thermal conductivity of 10 W/m·K or more.

The lid portion 37 has a flat plate shape and is disposed to cover the opening of the package case 36. The lid portion 37 and the package case 36 are joined by a resin or a solder. The lid portion 37 seals the opening of the package case 36 to seal the LED 35, and functions as a window that transmits ultraviolet rays from the LED 35. The lid portion 37 is made of sapphire.

The surface of the lid portion 37 is in contact with the channel space 70. Thus, the surface of the lid portion 37 is in direct contact with water at the time of sterilization.

Note that the entire surface of the lid portion 37 does not need to be in contact with the channel space 70, but the entire surface is preferably in contact with the channel space 70. A side surface of the lid portion 37 may be in contact with the channel space 70.

The lid portion 37 is not limited to a flat plate shape, and may be of a convex lens type. With the convex lens type, directivity of the ultraviolet rays emitted from the LED package 31 is narrowed, so that water can be more efficiently irradiated with the ultraviolet rays. In particular, when a difference between the refractive index of the material of the lid portion 37 and the refractive index of water is large, the convex lens type is suitable.

The material of the lid portion 37 is not limited to sapphire, and may be any material as long as it transmits ultraviolet rays emitted from the LED 35, but a material having a thermal conductivity of 0.25 W/m·K or more is preferable. This is for enhancing heat dissipation efficiency. For example, quartz, borosilicate glass, fluororesin, or the like can be used. From the viewpoint of enhancing the heat dissipation efficiency, a material having high thermal conductivity is preferable, and sapphire is preferably used as in the first embodiment. Further, the lid portion 37 may be formed of a material having a thermal conductivity higher than the thermal conductivity of the mounting substrate 32. This makes it possible to more efficiently conduct heat from the LED 35 to the lid portion 37 through the package case 36, so that heat dissipation efficiency can be improved.

A thickness of the lid portion 37 is preferably 0.1 mm or more. This increases spread of heat to widen a heat dissipation area, and thus heat dissipation to water through the lid portion 37 can be more efficiently performed. However, if the lid portion 37 becomes too thick, thermal resistance increases, and thus the area and thickness of the lid portion 37 are preferably set to achieve appropriate heat dissipation characteristics.

A plurality of LED packages 31 may be provided. In the first embodiment, heat of the LED package 31 can be efficiently dissipated, and thus a distance between the LED packages 31 can be shortened when the plurality of LED packages 31 are provided, whereby the light source unit 30 can be downsized.

The mounting substrate 32 is a substrate on which the LED package 31 is mounted. A circuit forming member 80 electrically connected to the LED package 31 is mounted on the mounting substrate 32. The circuit forming member 80 is a drive circuit for driving the LED package 31, a connector header for connecting the drive circuit and a power cable, or the like. In addition, a thermistor for measuring a temperature of the mounting substrate 32, a connector header for connecting the thermistor to the power cable, and the like are provided on the mounting substrate 32.

In the first embodiment, a heat sink is not provided on the back surface of the mounting substrate 32. Thus, an electronic component or a circuit may be mounted on the back surface of the mounting substrate 32. For example, only the LED package 31 may be mounted on the front surface of the mounting substrate 32, and an electronic component other than the LED package 31 may be mounted on the back surface. With the double-sided mounting, the area of the mounting substrate 32 can be reduced, whereby the light source unit 30 can be downsized.

The mounting substrate 32 is made of aluminum. Alternatively, any material can be used. In the related art, a heat sink is connected to the back surface of the mounting substrate 32, and thus, the mounting substrate 32 is made of a material having high thermal conductivity such as aluminum. On the other hand, in the first embodiment, the mounting substrate 32 is not a main heat dissipation path as described below, and thus the thermal conductivity of the mounting substrate 32 may be low. That is, in the first embodiment, the mounting substrate 32 has a wide range of material selection. For example, a glass epoxy substrate such as FR-4 or CEM3 or a flexible substrate made of polyimide or the like may be used. Further, the mounting substrate 32 may be subjected to various types of processing such as drilling.

The light source case 34 has a cylindrical shape, and holds the mounting substrate 32 therein. The light source case 34 is made of PP. Besides, SUS or the like may be used. An opening **34*b* for transmitting ultraviolet rays from the LED package 31 is provided in an upper surface (surface on the spacer 40 side) of the light source case 34. In the light source case 34, the mounting substrate 32 is disposed in such a manner that the opening 34*b* and the LED package 31 face each other. A width of the opening 34*b* is, for example, equal to or larger than the width of the lid portion 37. The upper surface of the lid portion 37 is disposed to be flush with a bottom surface of the opening 34*b***.

A projection **34*a* is provided on an outer upper surface of the light source case 34. The projection 34*a* is in contact with the spacer 40. The projection 34*a* generates a gap between the upper surface of the light source case 34 and the spacer 40, and water from the spacer 40 flows to the outlet 12 through the gap. This gap is also the channel space 70, with which the lid portion 37** is in contact.

The thread 38 is provided on an outer peripheral surface of the light source case 34. The thread 38 corresponds to the thread 13 provided on the inner peripheral surface of the housing 10. The light source unit 30 fitted into the housing 10 is screw-fixed with the thread 38 and the thread 13 of the housing 10 engaged with each other. Of course, the light source unit 30 may be fixed to the housing 10 by a method other than screwing.

The seal portion 33 is a caulking material formed to fill a gap between the mounting substrate 32 and the light source case 34. The seal portion 33 is made of a waterproof polymer material, such as a urethane resin, a silicone resin, or an epoxy resin. The seal portion 33 fills the light source case 34 up to the inner upper surface of the light source case 34, and covers the lower portion of the LED package 31 and the circuit forming member 80 such as the drive circuit of the mounting substrate 32, thereby preventing the connection portion between the LED package 31 and the mounting substrate 32 and the circuit forming member 80 from coming into contact with water. The outer surface of the lid portion 37 is not covered by the seal portion 33 and is in contact with the channel space 70.

Note that thermally conductive particles or thermally conductive fibers may be mixed in the seal portion 33. When high thermal conductivity is imparted to the seal portion 33, heat from the LED package 31 is easily dispersed via the seal portion 33, so that heat dissipation can be enhanced. In particular, it is preferable that the light source case 34 is also made of a material having high thermal conductivity such as a metal, and both the seal portion 33 and the light source case 34 are made of a material having high thermal conductivity. The light source case 34 is in contact with the channel space 70, and thus, the light source case 34 is in direct contact with water, which makes it possible to dissipate heat from the seal portion 33 to water via the light source case 34. As a result, heat dissipation can be further enhanced. The seal portion 33 may be brought into contact with the channel space 70 to dissipate heat from the seal portion 33 to water.

4. Heat Dissipation Path

Next, a heat dissipation path of heat generated from the LED package 31 will be described. When water is introduced from the inlet 11 to flow through the channel tube 20 and the spacer 40, and the light source unit 30 irradiates the water with ultraviolet rays to sterilize the water, heat is generated from the LED 35 of the light source unit 30. The heat generated from the LED 35 is conducted to the package case 36, and is conducted from the package case 36 to the lid portion 37. Here, the lid portion 37 is disposed to be in contact with the channel space 70, thereby being in direct contact with water flowing between the spacer 40 and the light source case 34. Accordingly, the heat is efficiently conducted from the lid portion 37 to water. As described above, in the first embodiment, heat generated from the LED 35 can be efficiently dissipated to water.

The seal portion 33 is in contact with both the package case 36 and the light source case 34, and the light source case 34 is in contact with the channel space 70. This forms a heat dissipation path through which heat is sequentially conducted to the package case 36, the seal portion 33, the light source case 34, and water. The heat dissipation through the heat dissipation path is effective in a case where the seal portion 33 is made of a material containing thermally conductive particles to increase the thermal conductivity.

In a case where the seal portion 33 is in contact with the channel space 70, a heat dissipation path through which heat is sequentially conducted to the package case 36, the seal portion 33, and water is also formed. Heat dissipation by the heat dissipation path is also effective when thermal conductivity of the seal portion 33 is increased.

5. Summary of Effects

As described above, in the fluid sterilization device 1 according to the first embodiment, it is possible to efficiently dissipate heat generated from the LED 35 from the lid portion 37 to water. Accordingly, it is not necessary to provide a heat dissipation structure such as a heat sink on the back surface of the mounting substrate 32, which makes it possible to reduce the size and weight of the device. In addition, the lid portion 37 of the LED package 31 is in direct contact with water, and thus incidence efficiency of ultraviolet rays to water is high, so that sterilization efficiency can be improved. Moreover, a window that partitions between the LED package 31 and the channel tube 20 is not required, and thus no window becomes cloudy, whereby the irradiation efficiency of the ultraviolet rays does not deteriorate.

In the fluid sterilization device 1 according to the first embodiment, it is not necessary to use a material having high thermal conductivity as the mounting substrate 32 or to provide a heat dissipation structure such as a heat sink on the back surface of the mounting substrate 32. Accordingly, a material having low thermal conductivity can be used as the material of the mounting substrate 32, and drilling, double-sided mounting, and the like on the mounting substrate 32 are facilitated, thereby increasing flexibility in the shape.

In the fluid sterilization device 1 according to the first embodiment, as the channel tube 20, the reflector 22 formed by laminating the unsintered PTFE films is used on the transparent tube 21. This can easily increase the ultraviolet reflectance on the side surface of the channel tube 20. In addition, it is possible to reduce the diameter of the channel tube 20 while maintaining the sterilization efficiency equivalent to that of the channel tube using a PTFE bulk in the related art.

The effects of the channel tube 20 in the first embodiment relative to the PTFE bulk will be described in detail below.

First, the channel tube 20 in the first embodiment can be easily formed as compared with the PTFE bulk.

The PTFE bulk is a molded product obtained by adding an additive to PTFE powder, filling the PTFE powder in a mold, compressing the PTFE powder to remove voids for densification, and then firing the PTFE powder, and has a block shape, a rod shape, a pipe shape, or the like. However, the PTFE bulk is not easy to mold and process, and the processing time becomes long, leading to high cost.

On the other hand, in the channel tube 20 of the first embodiment, it is only necessary to wind the unsintered PTFE film around the transparent tube 21, and the ultraviolet reflectance of the channel tube 20 can be easily improved. The transparent tube 21 and the unsintered PTFE film are in close contact with each other due to the self-fusion property of the unsintered PTFE film. Thus, no adhesive is required. The adhesive may be deteriorated by ultraviolet rays to cause peeling or cracking, but the channel tube 20 uses no adhesive, so that there is no such concern. In addition, light absorption by the adhesive does not occur, and thus higher reflectance can be achieved. Furthermore, the unsintered PTFE film is the outer peripheral surface of the transparent tube 21, and thus there is no possibility that the unsintered PTFE film is physically damaged by water pressure.

Second, the channel tube 20 in the first embodiment has high ultraviolet reflectance as compared with the PTFE bulk, and can be formed to be small.

The PTFE bulk is relatively thick to increase the ultraviolet reflectance, and it is necessary to reduce the inner diameter to reduce the size. However, the number of times of reflection on the inner peripheral surface increases to increase the light loss, thereby decreasing the sterilization efficiency.

In contrast, the unsintered PTFE film has higher ultraviolet reflectance than that of the PTFE bulk when compared at the same thickness, and thus the thickness of the channel tube 20 of the first embodiment can be made smaller than that in a case where the channel tube 20 is made of the PTFE bulk, whereby the channel tube 20 can be downsized. In addition, the difference in refractive index between quartz as a material of the transparent tube 21 and water is small, which can prevent ultraviolet rays reflected by the unsintered PTFE film from being reflected at the interface between quartz and water and returning. Accordingly, the reflectance of the entire channel tube 20 is improved.

The reason why the reflectance of the PTFE bulk is lower than that of the unsintered PTFE film is because in the PTFE bulk, there are gaps between crystal grains, and thus ultraviolet rays partially enter the PTFE bulk to be scattered by a crystal grain structure or the like. On the other hand, in the unsintered PTFE film, the crystal grains are dense, and thus penetration of ultraviolet rays into the unsintered PTFE film is suppressed, whereby the reflectance is high.

Third, in the channel tube 20 of the first embodiment, the inner wall surface is less likely to be contaminated as compared with the PTFE bulk, and a decrease in sterilization efficiency is suppressed.

The PTFE bulk is a sintered compact of powder, and is produced by machining, and thus has fine irregularities on the inner peripheral surface. Accordingly, the inner peripheral surface was easily contaminated. In particular, bacteria may adhere to the irregularities and grow to form a biofilm. When the inner peripheral surface of the channel tube 20 is contaminated, the ultraviolet reflectance decreases to decrease the sterilization efficiency.

On the other hand, the transparent tube 21 is made of quartz, and it is easy to process the inner peripheral surface to be flat. This makes the inner peripheral surface of the transparent tube 21 less likely to be contaminated, and a decrease in sterilization efficiency due to contamination is suppressed.

Fourth, according to the channel tube 20 in the first embodiment, the ultraviolet rays can easily reach far in the axial direction as compared with the case of the PTFE bulk, and the sterilization efficiency of water can be improved.

In the PTFE bulk, the ultraviolet rays propagate in the axial direction while being reflected by the inner wall surface of the PTFE bulk, but the propagation path is all water. Accordingly, the ultraviolet rays do not reach far in the axial direction due to attenuation due to reflection by the PTFE bulk and attenuation due to absorption of ultraviolet rays by water.

On the other hand, in the channel tube 20 in the first embodiment, the refractive index of quartz as the material of the transparent tube 21 is close to that of water. Thus, there is little ultraviolet reflection at the interface between water flowing through the transparent tube 21 and the transparent tube 21, and most of the ultraviolet rays are reflected at the interface between the transparent tube 21 and the reflector 22 and propagate in the axial direction of the channel tube 20. Accordingly, the ultraviolet rays propagate not only in the water but also through the transparent tube 21. The transparent tube 21 is made of quartz, and thus the absorption of ultraviolet rays is lower than that of water. As described above, in the case of the channel tube 20, the propagation path of the ultraviolet rays includes not only water but also quartz. As a result, the ultraviolet rays can be propagated farther than in the case of the PTFE bulk in which the ultraviolet rays propagate only in water. This effect is particularly effective when turbid water is sterilized by ultraviolet rays.

6. Experimental Example According to First Embodiment

Various experimental examples relating to the fluid sterilization device 1 according to the first embodiment will be described.

Experimental Example 1

For the fluid sterilization device 1 according to the first embodiment, a current of 350 mA was caused to pass through the LED 35, and heat distribution was obtained by simulation. The heat distribution was obtained by three patterns of air cooling (when no water was allowed to flow) and water cooling (when water was allowed to flow at flow rates of 0.6 L/min and 1.0 L/min). The water temperature was 20.5° C.

Figure 4A:
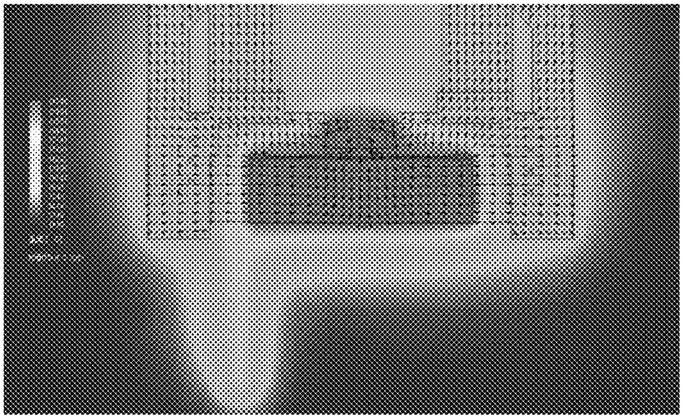
FIGS. 4A, 4B and 4C are diagrams showing a heat distribution in a cross section taken along a plane including an axis in the vicinity of the light source unit.
Figure 4B:
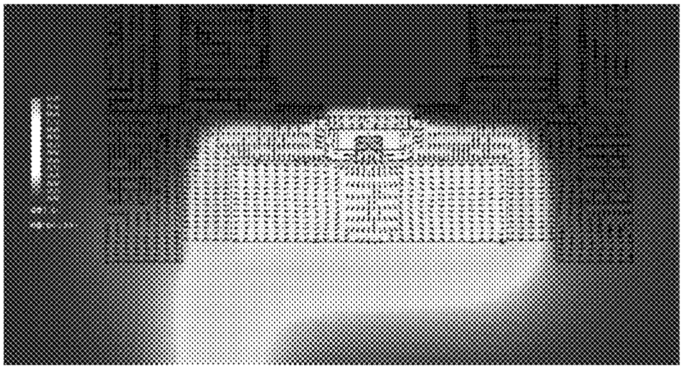
Figure 4C:
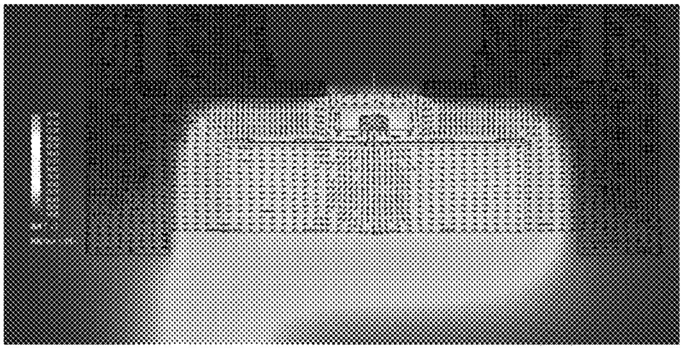

FIGS. 4A, 4B, and 4C are diagrams showing heat distribution in a cross section in a plane including the axis in the vicinity of the light source unit 30. In FIGS. 4A, 4B, and 4C, arrows illustrated in the cross section indicate heat conduction directions. FIG. 4A shows a case of air cooling, FIG. 4B shows a case of water cooling at a flow rate of 0.6 L/min, and FIG. 4C shows a case of water cooling at a flow rate of 1.0 L/min. As shown in FIG. 4A, in the case of air cooling, the mounting substrate 32 had high heat, and a junction temperature (maximum temperature of the LED 35) was 247° C. On the other hand, as shown in FIGS. 4B and 4C, when water was allowed to flow, the temperature of the mounting substrate 32 decreased, and the junction temperature was 61.2° C. at a flow rate of 0.6 L/min and 59.0° C. at a flow rate of 1.0 L/min. As a result, it was found that heat can be efficiently dissipated from the lid portion 37 to water.

Experimental Example 2

The junction temperature of the fluid sterilization device 1 according to the first embodiment was actually measured. The water temperature was 25.2° C. When the flow rate was 1.0 L/min and the current of the LED 35 was 350 mA, the junction temperature was 60.7° C. When the flow rate was 0.6 L/min and the current of the LED 35 was 350 mA, the junction temperature was 64.3° C. It was confirmed, also in the actual measurement, that in the fluid sterilization device 1 according to the first embodiment, it is possible to efficiently dissipate heat from the lid portion 37 to water.

Experimental Example 3

Sterilization performance of the fluid sterilization device 1 according to the first embodiment was evaluated. As the reflector 22 of the channel tube 20, an unsintered film PTFE_A shown in Experimental Example 5, and FIGS. 7 and 8 described below was used, and the thickness was 0.4 mm. An inactivation rate (Log) was measured using water containing *Escherichia coli* NBRC 3972 at a concentration of $10^5$ CFU/mL. The measurement was performed twice, and an average value was obtained. The LED 35 had a current of 350 mA, an output of 62 mW, and a wavelength of 280 nm. In addition, a flow rate of water was set to three types of 0.6 L/min, 0.8 L/min, and 1.0 L/min.

Figure 5:
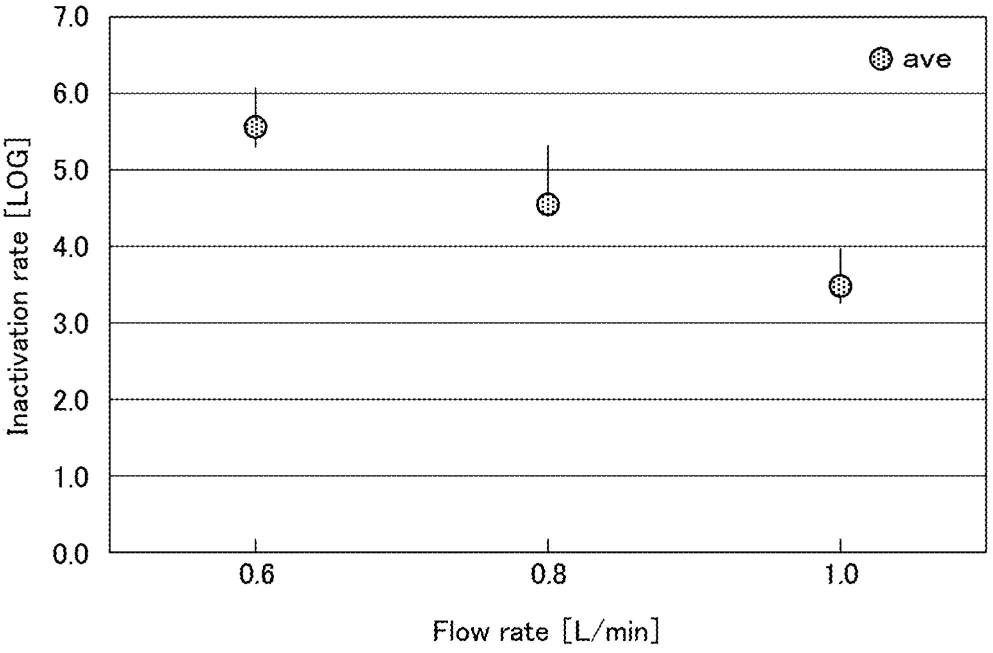
FIG. 5 is a graph showing a relationship between a flow rate (L/min) of water and an inactivation rate (Log)

FIG. 5 is a graph showing a relationship between a flow rate (L/min) of water and an inactivation rate (Log). As shown in FIG. 5, the inactivation rate was 3.5 Log at a flow rate of 1.0 L/min, 4.6 Log at a flow rate of 0.8 L/min, and 5.6 Log at a flow rate of 0.6 L/min. The inactivation rate was 3 Log or more at any flow rate, indicating high sterilization performance. As a result, it has been found that sufficient sterilization performance can be obtained also in the fluid sterilization device 1 according to the first embodiment.

Experimental Example 4

The material of the mounting substrate 32 was changed to FR-4 (glass epoxy substrate) (referred to as Experimental Example 4-1), and the heat distribution was obtained by simulation in the same manner as in Experimental Example 1. The flow rate of water was set to 1.0 L/min. In addition, the heat distribution was similarly obtained in a case where the mounting substrate 32 was reduced in thickness (t=1.6 mm) and embedded in the seal portion 33 (referred to as Experimental Example 4-2), and in a case where the mounting substrate 32 was changed to FR-4 and the light source case 34 was changed from PP to SUS (referred to as Experimental Example 4-3).

Figure 6A:
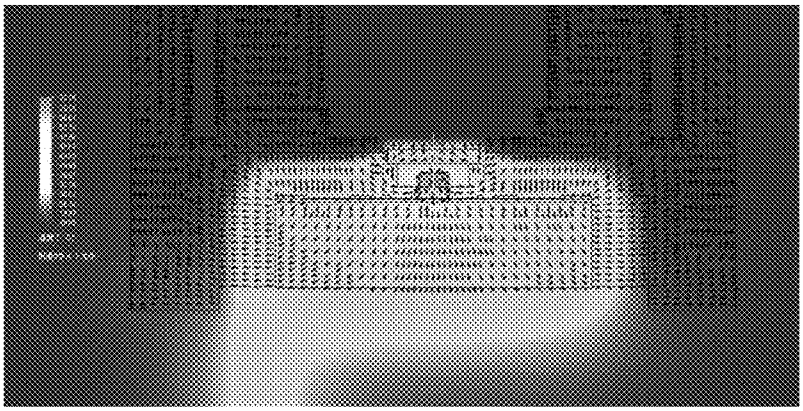
FIGS. 6A, 6B, and 6C are diagrams showing a heat distribution in a cross section taken along the plane including the axis in the vicinity of the light source unit.
Figure 6B:
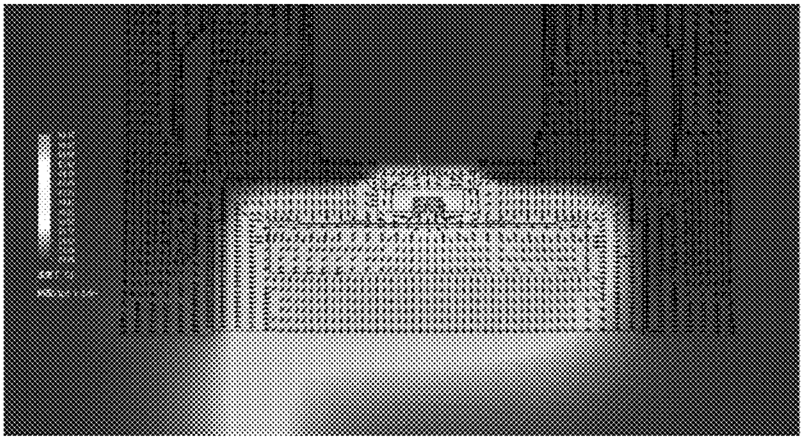
Figure 6C:
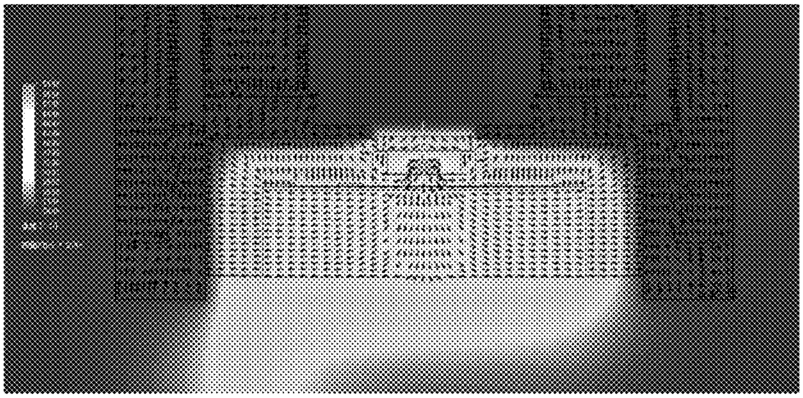

FIGS. 6A, 6B, and 6C are diagrams showing heat distribution in a cross section in a plane including the axis in the vicinity of the light source unit 30. FIG. 6A shows Experimental Example 4-1, FIG. 6B shows Experimental Example 4-2, and FIG. 6C shows Experimental Example 4-3. As shown in FIGS. 6A, 6B, and 6C, it was found that the temperature of the mounting substrate 32 was lowered in all the cases. The junction temperature was 63.3° C. in the case of Experimental Example 4-1, 62.2° C. in the case of Experimental Example 4-2, and 58.9° C. in the case of Experimental Example 4-3. As a result, it was found that heat can be efficiently dissipated from the lid portion 37 to water. It has been also found that heat can be dissipated regardless of the materials of the mounting substrate 32 and the light source case 34. This indicates that the mounting substrate 32 and the light source case 34 are not main heat dissipation paths in the first embodiment.

Experimental Example 5

For the unsintered PTFE and the sintered PTFE, the ultraviolet reflectance at each thickness was measured. The wavelength was 280 nm, and the reflectance was a relative value (%) to that of the standard reflector of $BaSO_4$. Three types of samples (unsintered PTFE_A to PTFE_C) produced by different companies were prepared for the unsintered PTFE, and four types of samples (sintered PTFE_A to PTFE_D) produced by different companies were prepared for the sintered PTFE.

Figure 7:
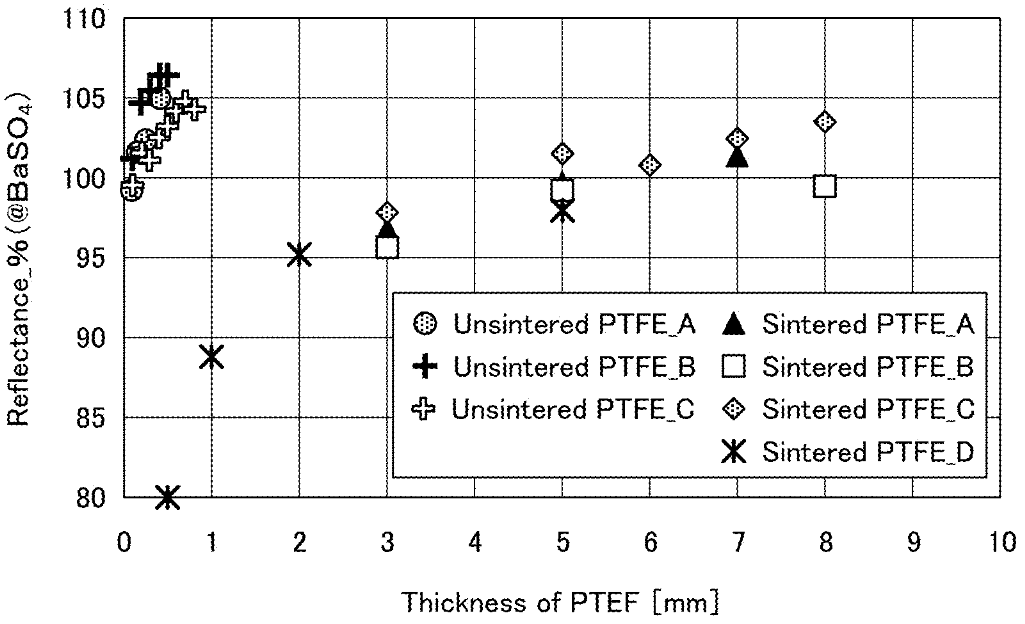
FIG. 7 is a graph showing a relationship between a thickness and a reflectance of unsintered PTFE and sintered PTFE.
Figure 8:
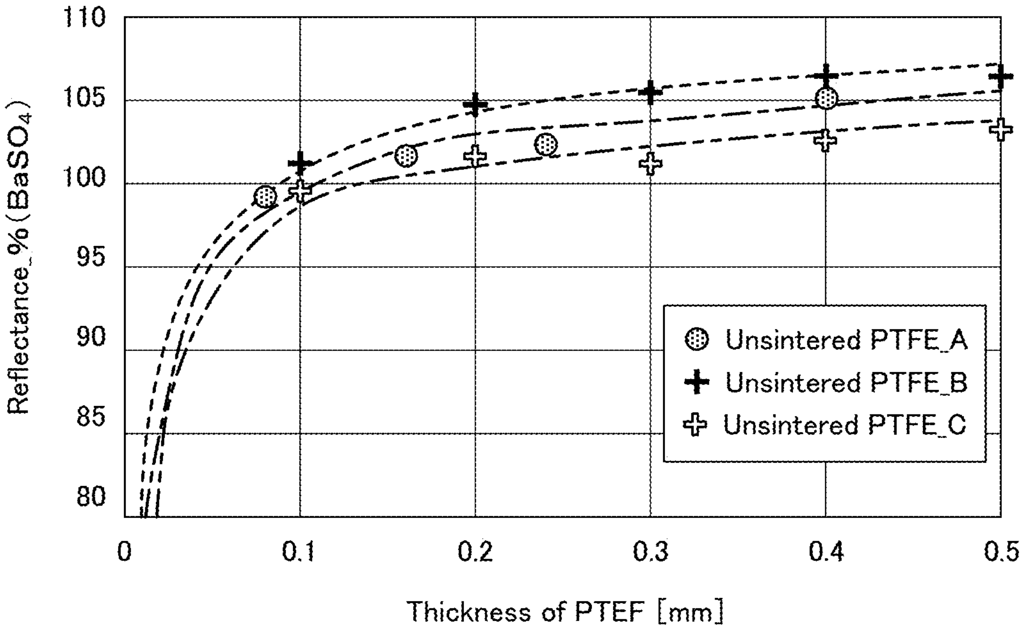
FIG. 8 is a graph showing a relationship between the thickness and the reflectance of unsintered PTFE.

FIGS. 7 and 8 each are a graph showing a relationship between the thickness and the reflectance of PTFE. As shown in FIGS. 7 and 8, the unsintered PTFE had high reflectance even when the thickness was smaller than that of the sintered PTFE, and sufficient reflection characteristics were obtained when the thickness was 1 mm or less. The maximum reflectance of the sintered PTFE was that of 8 mm thick sintered PTFE_C. However, the unsintered PTFE_B with a thickness of 0.2 mm or more had reflectance higher than that of the sintered PTFE_C. As a result, it was found that the thickness of the unsintered PTFE is preferably 0.2 mm or more.

Experimental Example 6

The relationship between the reflectance of the reflector 22 of the channel tube 20 and the irradiation dose at flow rates of 1.0 L/min, 0.8 L/min, and 0.6 L/min in the structure of Experimental Example 1 was obtained by simulation. The unsintered PTFE_A having a thickness of 0.4 mm and reflectance of 105.2% shown in FIGS. 7 and 8 was used for the reflector 22.

Figure 9:
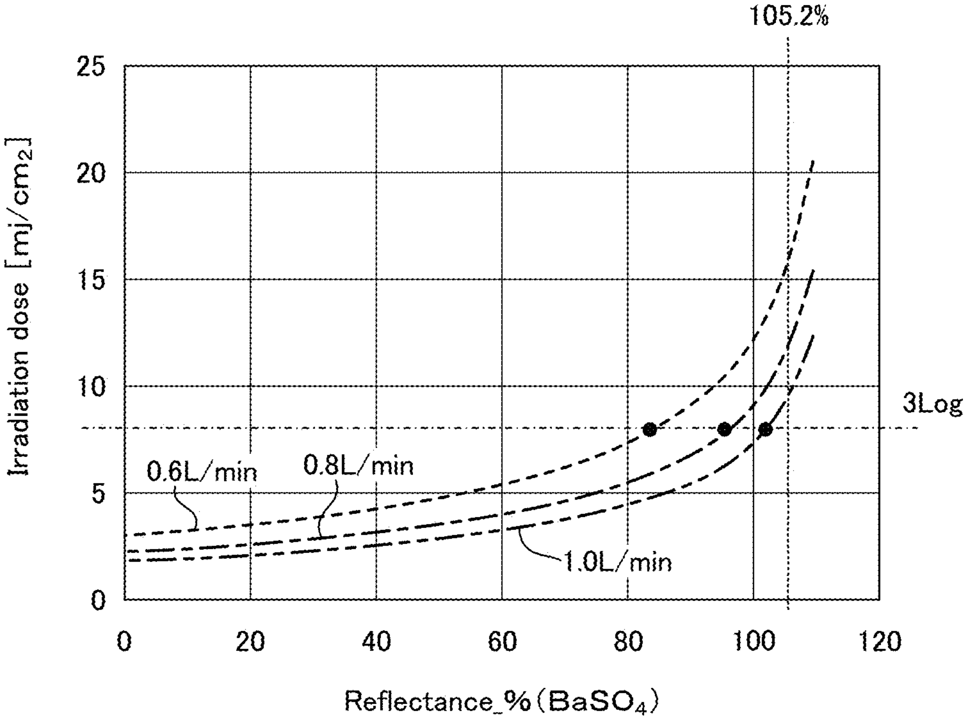
FIG. 9 is a graph showing a relationship between a reflectance of a reflector of a channel tube and an irradiation dose.

FIG. 9 is a graph showing the results. The irradiation doses at reflectance of 105.2% at the respective flow rates are about 9.5 $mJ/cm^2$, 12 $mJ/cm^2$, and 16 $mJ/cm^2$, and thus it is considered that the inactivation rate 3 Log corresponds to about 8 $mJ/cm^2$. The reflectance of the reflector 22 of the channel tube 20 for obtaining sterilization performance with an inactivation rate of 3 Log at each flow rate is approximately 84% at 0.6 L/min, approximately 96% at 0.8 L/min, and approximately 102% at 1.0 L/min. From FIG. 8, it is possible to satisfy these conditions when the film thickness is 0.1 mm at 1.0 L/min, 0.04 mm at 0.8 L/min, and 0.01 mm at 0.6 L/min.

Experimental Example 7

For the fluid sterilization device 1 according to the first embodiment, the thermal conductivity of the package case 36 was changed to various values, and the junction temperature was obtained by simulation under the same conditions as in Experimental Example 1.

Figure 10:
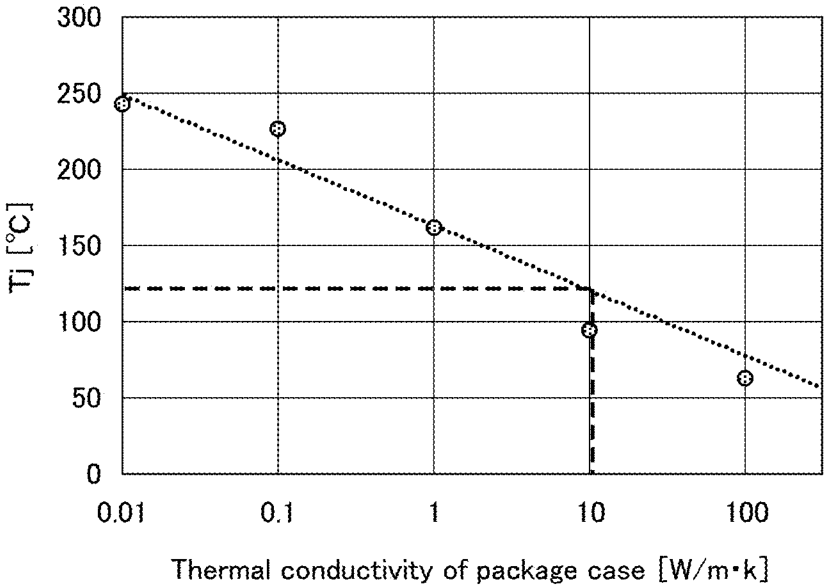
FIG. 10 is a graph showing a relationship between a thermal conductivity of a package case and a junction temperature.

FIG. 10 is a graph showing a relationship between a thermal conductivity of the package case 36 and a junction temperature. As shown in FIG. 10, it has been found that the junction temperature decreases as the thermal conductivity of the package case 36 increases. The maximum junction temperature of a general ultraviolet LED is 100 to 150° C., and thus it has been found that when the thermal conductivity of the package case 36 is 10 W/m K or more, sufficient heat dissipation can be obtained.

Experimental Example 8

For the fluid sterilization device 1 according to the first embodiment, the thermal conductivity of the lid portion 37 was changed to various values, and the junction temperature was obtained by simulation under the same conditions as in Experimental Example 1.

Figure 11:
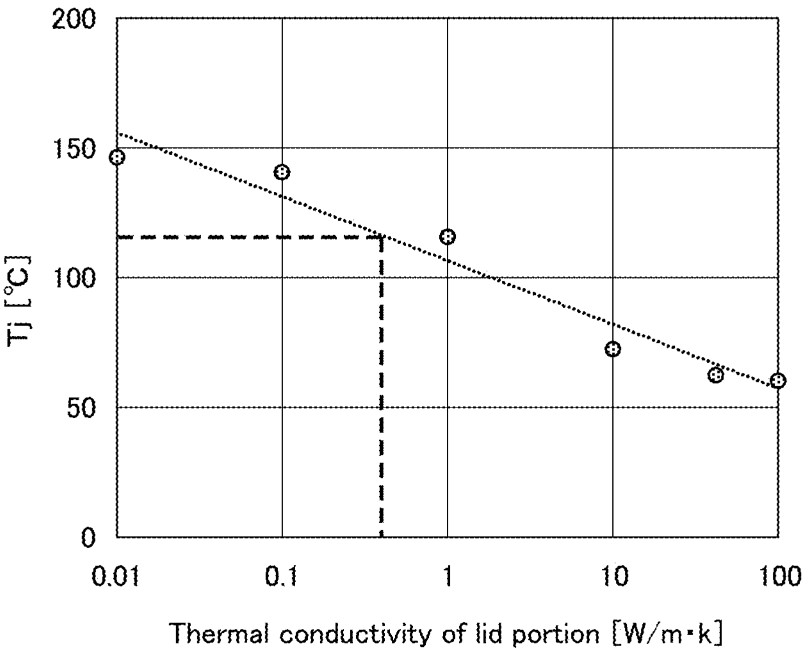
FIG. 11 is a graph showing a relationship between a thermal conductivity of a lid portion and the junction temperature.

FIG. 11 is a graph showing a relationship between a thermal conductivity of the lid portion 37 and a junction temperature. As shown in FIG. 11, it has been found that the junction temperature decreases as the thermal conductivity of the lid portion 37 increases. The maximum junction temperature of a general ultraviolet LED is 100° ° C. to 150° C., and thus it has been found that when the thermal conductivity of the lid portion 37 is 0.25 W/m·K or more, sufficient heat dissipation can be obtained.

First Modification of First Embodiment

In the first embodiment, the upper surface of the lid portion 37 (surface opposite to the LED 35 side) is arranged to be flush with the bottom surface of the opening **34*b* (surface on the LED 35 side), but any arrangement may be adopted as long as the upper surface of the lid portion 37 is not covered with the seal portion 33. For example, the upper surface of the lid portion 37 may be arranged to be inside the opening 34*b*, or the upper surface of the lid portion 37 may be arranged to be closer to the spacer side than the outer upper surface of the light source case 34. A region of the LED package 31 in contact with the channel space 70** becomes wider, and thus the heat dissipation efficiency also becomes higher.

Second Modification of First Embodiment

Figure 12:
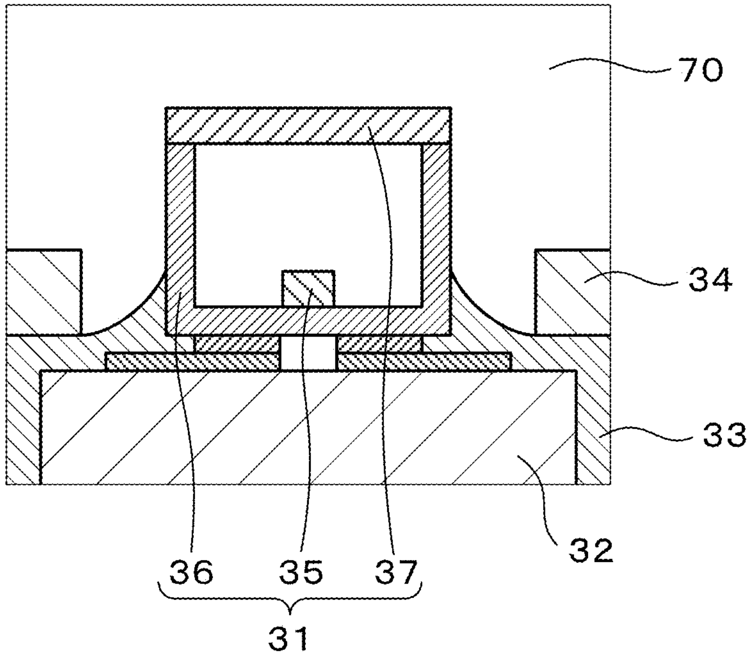
FIG. 12 is a cross-sectional view illustrating a configuration of a part in the vicinity of an LED package according to a second modification of the first embodiment, the cross-sectional view being taken along a plane including an axis.

FIG. 12 is a cross-sectional view illustrating a second modification of the first embodiment and illustrating a configuration of a part in the vicinity of the LED package 31, the cross-sectional view being taken along a plane including the axis. However, the circuit forming member 80 is not illustrated.

As illustrated in FIG. 12, in the second modification, the LED package 31 is protruded toward the spacer 40, and a part of the package case 36 is located closer to the spacer 40 than the light source case 34. Not only the upper surface of the lid portion 37 but also the side surface of the lid portion 37 and the outer peripheral side surface (excluding the lower end) of the package case 36 are in contact with the channel space 70 not to be covered with the seal portion 33. As a result, when water is introduced into the channel tube 20, not only the lid portion 37 but also the side surface of the package case 36 is in direct contact with the water. Accordingly, not only the heat dissipation path from the lid portion 37 to water but also the heat dissipation path from the package case 36 to water is formed, and the heat dissipation area is widened, so that the heat dissipation efficiency can be improved.

Third Modification of First Embodiment

Figure 13:
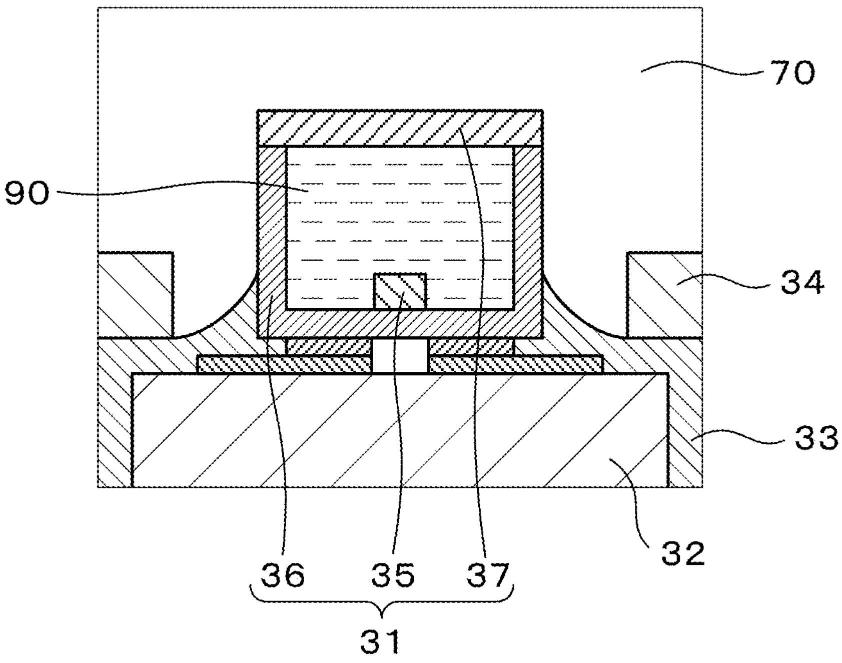
FIG. 13 is a cross-sectional view illustrating a configuration of a part in the vicinity of an LED package according to a third modification of the first embodiment, the cross-sectional view being taken along a plane including an axis.

FIG. 13 is a cross-sectional view illustrating a third modification of the first embodiment and illustrating a configuration of a part in the vicinity of the LED package 31, the cross-sectional view being taken along a plane including the axis. The third modification has a structure in which, in the second modification, the inside of the package case 36 is filled with a sealing member 90 to seal the LED 35. The inside may be completely filled or partially filled. The sealing member 90 is in contact with the lid portion 37 and the package case 36. The sealing member 90 may be any material that transmits ultraviolet rays and has a higher thermal conductivity than air, and may be a liquid such as oil or a resin, or a solid such as a cured resin or glass. The thermal conductivity of the sealing member 90 is preferably 0.1 W/m. K or more.

In the third modification, a path for heat conduction from the LED 35 to the lid portion 37 and the package case 36 through the sealing member 90 is generated, so that heat can be dissipated more efficiently.

Fourth Modification of First Embodiment

Figure 14:
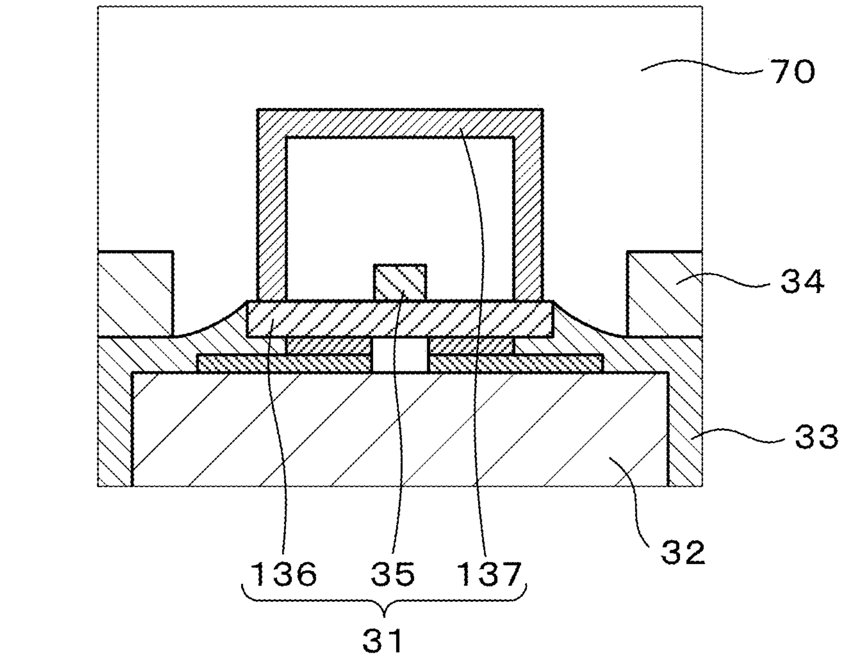
FIG. 14 is a cross-sectional view illustrating a configuration of a part in the vicinity of an LED package according to a fourth modification of the first embodiment, the cross-sectional view being taken along a plane including an axis.

FIG. 14 is a cross-sectional view illustrating a fourth modification of the first embodiment and illustrating a configuration of a part in the vicinity of the LED package 31, the cross-sectional view being taken along a plane including the axis.

As illustrated in FIG. 14, in the fourth modification, the package case 36 is replaced with a flat substrate 136, and the lid portion 37 is replaced with a lid portion 137 having a rectangular parallelepiped box shape.

The LED 35 is disposed on the substrate 136. The substrate 136 is preferably made of a material having high ultraviolet reflectance and high thermal conductivity, for example, the same material as the package case 36. A part of the side surface of the substrate 136 is not covered with the seal portion 33 and is in direct contact with water.

The lid portion 137 has a rectangular parallelepiped box shape, and has an internal space and an opening portion which is an opening of the internal space. The lid portion 137 is arranged on the substrate 136 to seal the LED 35 in the internal space. That is, the lid portion 137 is arranged on the substrate 136 in such a manner that the opening portion is on the substrate 136 side, and the LED 35 is arranged on the substrate 136 to be inside the lid portion 137. In addition, the substrate 136 and the lid portion 137 are joined by an adhesive. This seals the LED 35 inside the lid portion 137. The upper surface and the side surface of the lid portion 137 are not covered with the seal portion 33 and are in direct contact with water. The shape of the lid portion 137 is not limited to the rectangular parallelepiped shape, and may be any shape as long as it has an internal space capable of sealing the LED 35 and an opening portion where the internal space opens. For example, it may have a hemispherical shell shape or the like. The internal space of the lid portion 137 may be filled with the sealing member 90 as in the second modification.

In the fourth modification, heat can be dissipated from the upper surface and the side surface of the lid portion 137 and the substrate 136 to water, and the heat dissipation area is widened, so that the heat dissipation efficiency can be improved.

The lid portion 137 and the LED 35 may be brought into close contact with each other by glass sealing or the like, and sealed not to form an internal space. In this case, heat can be directly conducted from the LED 35 to the lid portion 137, and heat can be efficiently dissipated. The substrate 136 and the lid portion 137 may be made of the same material and integrated.

Fifth Modification of First Embodiment

Figure 15:
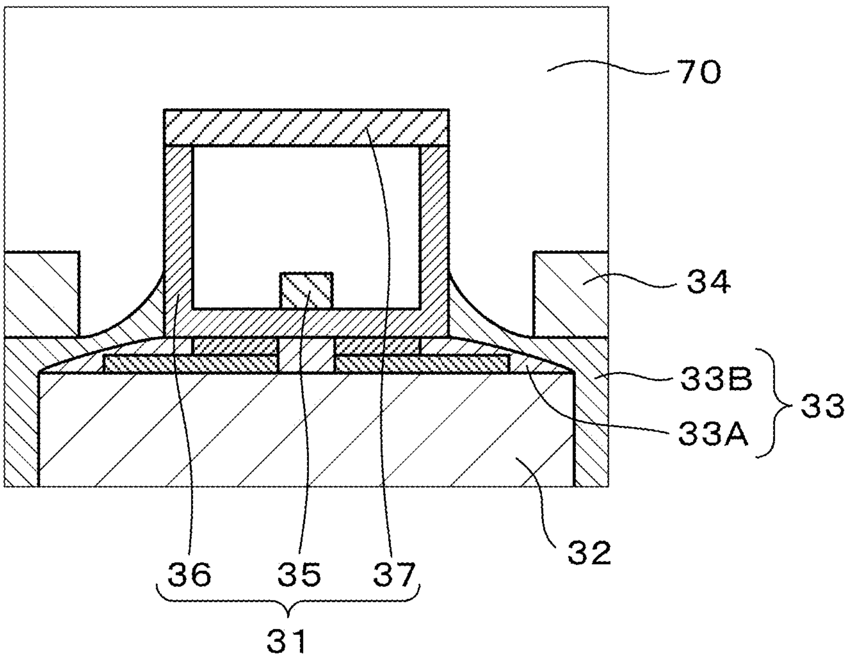
FIG. 15 is a cross-sectional view illustrating a configuration of a part in the vicinity of an LED package according to a fifth modification of the first embodiment, the cross-sectional view being taken along a plane including an axis.

The seal portion 33 may have a two-layer structure of a first seal portion 33A and a second seal portion 33B. FIG. 15 illustrates a case where a two-layer structure is adopted in the second modification. As illustrated in FIG. 15, the first seal portion 33A is provided on the surface of the mounting substrate 32 and in a gap between the LED package 31 and the mounting substrate 32. As a result, the circuit forming member 80 on the mounting substrate 32 and a connection portion between the LED package 31 and the mounting substrate 32 are waterproofed, and adhesion between the LED package 31 and the mounting substrate 32 is enhanced. The second seal portion 33B is provided to fill a gap between the first seal portion 33A and the light source case 34.

The first seal portion 33A is substantially not irradiated with ultraviolet rays from the LED 35. Thus, any material may be used as long as it has adhesion to the mounting substrate 32 and waterproofness, and ultraviolet resistance is not required. In addition, as long as the second seal portion 33B has waterproofness and ultraviolet resistance, adhesion to the mounting substrate 32 does not become a significant problem. As described above, when the seal portion 33 is formed to have a two-layer structure of the first seal portion 33A and the second seal portion 33B, it is possible to select a material suitable for each function, so that it is possible to widen a range of material selection. For example, a fluororesin, ethylene propylene rubber (EPDM), a liquid gasket, or the like can be used for the first seal portion 33A.

Sixth Modification of First Embodiment

Figure 16:
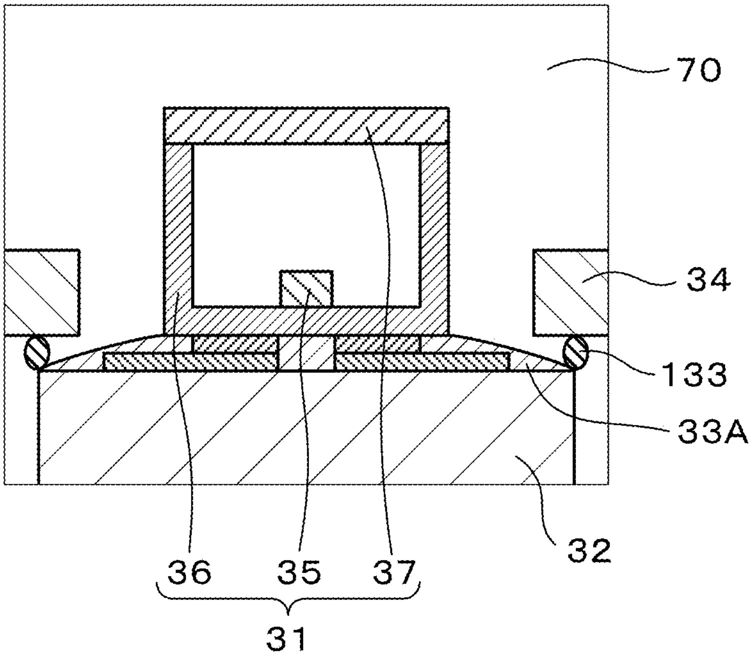
FIG. 16 is a cross-sectional view illustrating a configuration of a part in the vicinity of an LED package according to a sixth modification of the first embodiment, the cross-sectional view being taken along a plane including an axis.

As illustrated in FIG. 16, in the sixth modification, the second seal portion 33B may be omitted, and a gasket 133 may be provided between the first seal portion 33A and the light source case 34. The gasket 133 seals in such a manner that water does not flow around to the side surface and the back surface side of the mounting substrate 32. In the sixth modification, a contact area between the LED package 31 and water can be increased, whereby the heat dissipation efficiency can be improved.

Second Embodiment

Figure 17:
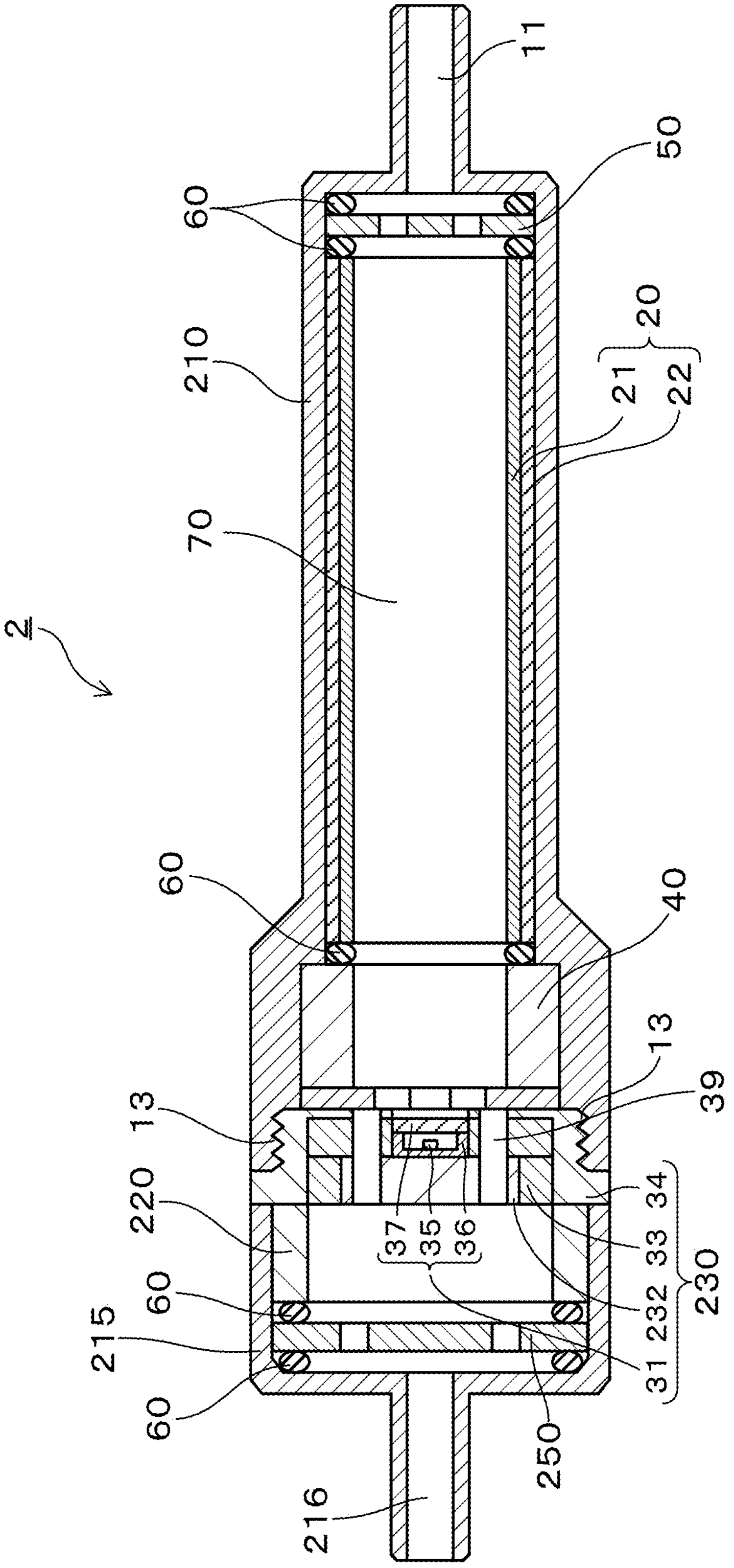
FIG. 17 is a cross-sectional view illustrating a configuration of a fluid sterilization device according to a second embodiment, the cross-sectional view being taken along a plane including an axis.

FIG. 17 is a cross-sectional view illustrating a configuration of a fluid sterilization device 2 according to a second embodiment, the cross-sectional view being taken along a plane including an axis. As illustrated in FIG. 17, the fluid sterilization device 2 according to the second embodiment is a straight tube type device in which an outlet 216 is provided coaxially with an inlet 11 on a side opposite to the inlet 11 across a light source unit 230. Among the reference numerals in FIG. 17, the same reference numerals as those used in the first embodiment represent the same components and the like as those in the first embodiment unless otherwise specified. As illustrated in FIG. 17, the fluid sterilization device 2 according to the second embodiment includes housings 210, 215, channel tubes 20, 220, the light source unit 230, a spacer 40, and a plate 50, 250.

The housing 210 is similar to the housing 10 of the first embodiment except that the outlet 12 is not provided. The light source unit 230 is similar to the light source unit except that a through hole 39 penetrating the light source unit 230 in the axial direction is provided and a mounting substrate 232 is used instead of the mounting substrate 32. The through hole 39 is at a position that does not pass through the LED package 31. The mounting substrate 232 is a glass epoxy substrate, and is otherwise similar to the mounting substrate 32 of the first embodiment. The mounting substrate 232 is not limited to a glass epoxy substrate, and may be any substrate that is easily drilled.

The housing 215 is provided on the back surface (surface opposite to the spacer 40 side) of the light source unit 230. The housing 215 has a cylindrical shape, and has one end surface opened and joined to the back surface of the light source unit 230. An outlet 216 is provided on the other end surface. The outlet 216 is disposed coaxially with the inlet 11. Inside the housing 215, a plate 250 and a channel tube 220 are coaxially arranged in this order from the outlet 216 side, and the channel tube 220 is in contact with the back surface of the light source unit 230. O-rings 60 are provided between the housing 215 and the plate 250 and between the plate 250 and the channel tube 220, respectively. The plate 250 is similar to the plate 50 except that the diameter is different. The housing 215 is made of, for example, PP, and may be made of the same material as the housing 210.

The channel tube 220 has a cylindrical shape and is disposed coaxially with the housing 215. The channel tube 220 is a tube that guides water from the through hole 39 of the light source unit 230 to the outlet 216. The channel tube 220 is not irradiated with ultraviolet rays, and thus any material may be used for the channel tube 220. For example, SUS or quartz glass can be used. The channel tube 220 and the plate 250 need not be provided as long as the housing 215 can sufficiently withstand water pressure.

In the second embodiment, water flowing from the inlet 211 of the housing 210 sequentially flows through the plate 50, the channel tube 20, and the spacer 40, then flows to the back surface side of the light source unit 230 through the through hole 39 of the light source unit 230, flows through the channel tube 220 and the plate 250, and is discharged from the outlet 216 of the housing 215. As in the first embodiment, the water flowing through the spacer 40 and the channel tube 20 is irradiated with ultraviolet rays from the light source unit 230, and the water is sterilized.

The fluid sterilization device 2 according to the second embodiment can obtain the same effects as those of the fluid sterilization device 1 according to the first embodiment. Conventionally, a heat sink is provided on the back surface of the mounting substrate 32 to dissipate heat, and it is necessary to use a material having high thermal conductivity for the mounting substrate 232. However, in the second embodiment, heat can be efficiently dissipated from the lid portion 37, and thus it is not necessary to provide a heat sink on the back surface of the mounting substrate 232, so that a material easy to process and having low thermal conductivity, such as a glass epoxy substrate, can be used as the mounting substrate 232. Accordingly, as in the fluid sterilization device 2 according to the second embodiment, the outlet 216 can be provided coaxially with the inlet 11 on the back surface side of the mounting substrate 232, and the fluid sterilization device can be a straight pipe type.

Experimental Example 9

For the fluid sterilization device 2 according to the second embodiment, the thermal conductivity of the mounting substrate 232 was changed to various values, and the junction temperature was obtained by simulation under the same conditions as in Experimental Example 1.

Figure 18:
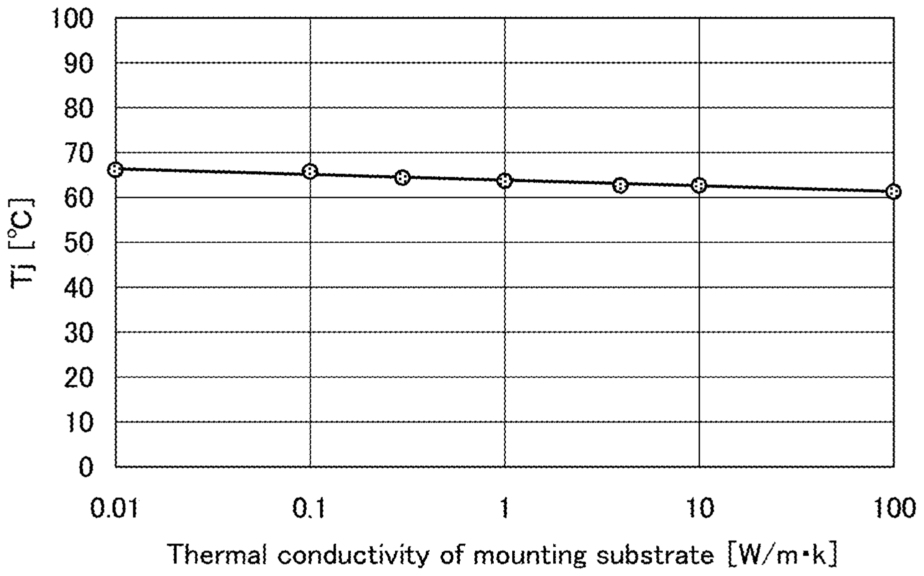
FIG. 18 is a graph showing a relationship between a thermal conductivity of a mounting substrate and a junction temperature in the second embodiment.

FIG. 18 is a graph showing a relationship between a thermal conductivity of the mounting substrate 232 and a junction temperature. As shown in FIG. 18, it has been found that a decrease in junction temperature is extremely small with respect to an increase in thermal conductivity of the mounting substrate 232. This indicates that the mounting substrate 232 is not a heat dissipation path. As a result, it has been found that a material having low thermal conductivity can also be employed as the material of the mounting substrate 232, and may be subjected to drilling or the like.

Third Embodiment

Figure 19:
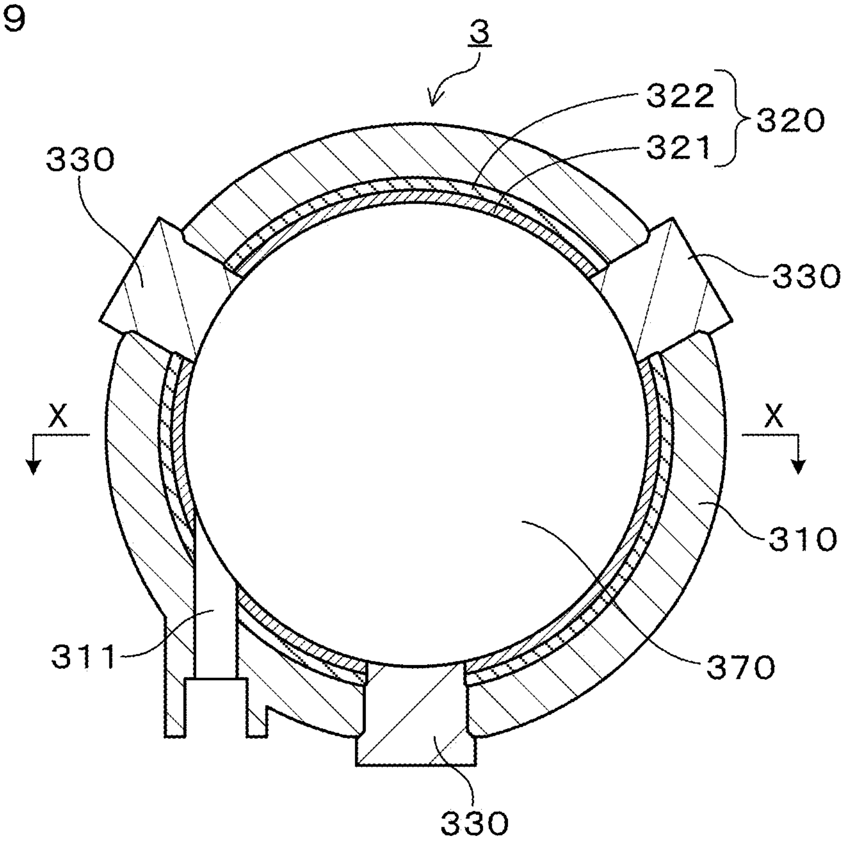
FIG. 19 is a cross-sectional view illustrating a fluid sterilization device according to a third embodiment, the cross-sectional view being taken along a plane orthogonal to an axis and passing through a light source unit.
Figure 20:
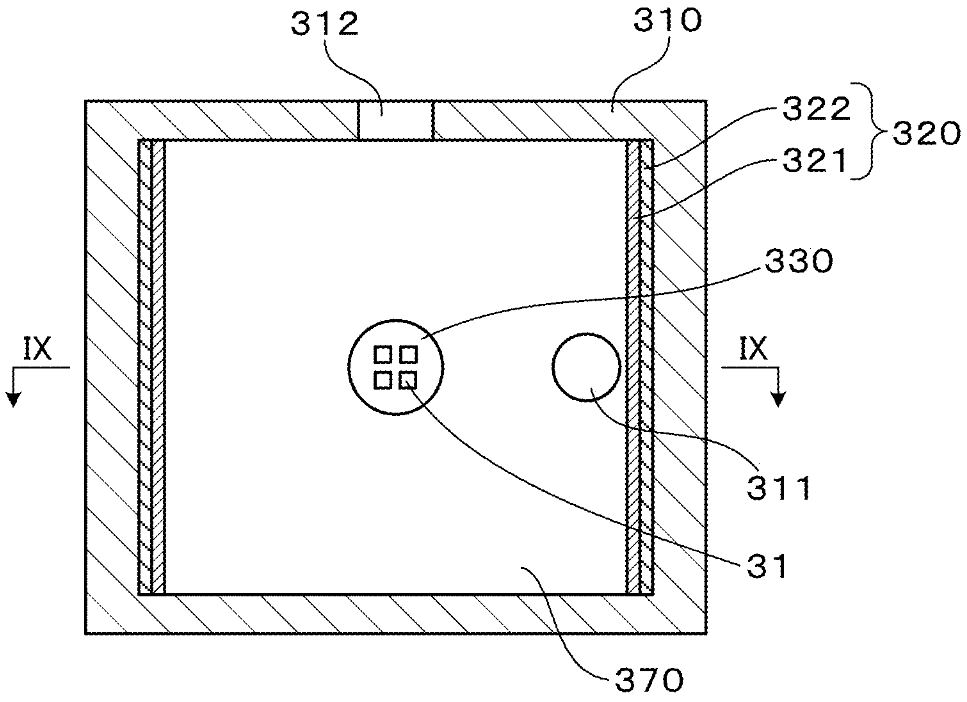
FIG. 20 is a cross-sectional view illustrating the fluid sterilization device according to the third embodiment, the cross-sectional view being taken along a plane including an axis.

FIGS. 19 and 20 each are views illustrating a configuration of a fluid sterilization device 3 according to a third embodiment. The fluid sterilization device 3 has a columnar shape, and FIG. 19 is a cross-sectional view perpendicular to the axis of the column and illustrates a cross section passing through a light source unit 330. FIG. 20 illustrates a cross section taken along a plane including the axis of the column. Among reference numerals in FIGS. 19 and 20, the same reference numerals as those used in the first and second embodiments represent the same components and the like as those in the first and second embodiments unless otherwise specified. As illustrated in FIGS. 19 and 20, the fluid sterilization device 3 according to the third embodiment includes a housing 310, a channel tube 320, and a light source unit 330.

The housing 310 has a cylindrical shape in which the channel tube 320 is disposed. An upper surface of the cylinder of the housing 310 is provided with an outlet 312. A side surface of the housing 310 is provided with a through hole penetrating the housing 310 and the channel tube 320, and the through hole serves as an inlet 311. An axis of the inlet 311 is perpendicular to the axis of the housing 310 and parallel to a tangent of the circumference of the cylinder. When the axis of the inlet 311 is set in this manner, it is possible to generate a flow in which water rotates around the axis in the channel tube 320. As a result, the time for irradiating water with ultraviolet rays can be lengthened to improve the sterilization efficiency.

The channel tube 320 has a cylindrical shape, and the inside thereof is a channel space 370, that is, a space through which water flows at the time of sterilization, and is a region irradiated with ultraviolet rays. The channel tube 320 includes a transparent tube 321 and a reflector 322 provided in contact with an outer peripheral surface of the transparent tube 321. The reflector 322 is in contact with the inner peripheral surface of the housing 310. The transparent tube 321 and the reflector 322 are similar to the transparent tube 21 and the reflector 22 of the first embodiment. The reflector 322 has high reflectance of ultraviolet rays, and can efficiently irradiate water flowing through the channel tube 320 with ultraviolet rays by reflecting ultraviolet rays on the side surface of the channel tube 320.

Through holes for fitting the light source unit 330 are provided on the side surfaces of the housing 310 and the channel tube 320. An axis of each of the through holes is perpendicular to the axis of the channel tube 320 and is a direction toward the axis. Three through holes are provided at equal intervals in the circumferential direction of the cylinder.

The light source unit 330 is the same as the light source unit 30 of the first embodiment except that the number of the LED packages 31 is four, and the side surface of the light source case 34 is provided with neither thread 38 nor projection 34*a*. The LED packages 31 are arranged in a 2×2 matrix shape. The light source unit 330 is fitted into each of the three through holes, and is fitted in such a manner that an emitting direction of the ultraviolet rays is the axial direction of the channel tube 320. The lid portion 37 of each LED package 31 is disposed to be in contact with the channel space. Thus, when water is conducted from the inlet 311, the lid portion 37 is in direct contact with water.

The fluid sterilization device 3 according to the third embodiment can obtain the same effects as those of the fluid sterilization device 1 according to the first embodiment.

Modified Example

As in the first to third embodiments, the LED package 31 may be arranged in any manner as long as the lid portion 37 is arranged in contact with the channel space. The inlet and the outlet may be disposed at any position, and the positions of the inlet and the outlet may be exchanged in the first to third embodiments.

In the first to third embodiments, sterilization of a liquid has been described, but any fluid can be sterilized, and a gas, a mixture of a gas and a liquid, a mixture of a gas and a powdery solid, and the like can also be sterilized.

What is claimed is:

1. A fluid sterilization device comprising:

a light source unit configured to emit an ultraviolet ray; and a channel space that the ultraviolet ray from the light source unit enters, the channel space being a space through which a fluid flows, wherein the light source unit includes a mounting substrate, and an LED package mounted on the mounting substrate, the LED package includes a light emitting element configured to emit the ultraviolet ray, and a lid portion transmitting the ultraviolet ray from the light emitting element, disposed in contact with and exposed to the channel space, and configured to conduct heat conducted from the light emitting element to a fluid flowing through the channel space, wherein the lid portion is formed of a material having a thermal conductivity greater than a thermal conductivity of the mounting substrate.

2. The fluid sterilization device according to claim 1, wherein the LED package includes a package case including an internal space and an opening portion through which the internal space opens, the package case accommodating the light emitting element in the internal space, having a bottom surface side mounted on the mounting substrate, and being configured to conduct heat generated from the light emitting element to the opening side, the lid portion seals the opening portion of the package case, and heat from the light emitting element is conducted to the lid portion through the package case.

3. The fluid sterilization device according to claim 2, wherein the package case is disposed in contact with the channel space and configured to conduct heat conducted from the light emitting element to the fluid flowing through the channel space.

4. The fluid sterilization device according to claim 1, wherein the LED package includes a plate-shaped substrate on which the light emitting element is placed, the lid portion includes an internal space and an opening portion through which the internal space opens, the lid portion is disposed on the substrate with the opening portion on the substrate side and the light emitting element positioned in the internal space, and the lid portion is configured to conduct heat conducted from the light emitting element through the substrate to the fluid flowing through the channel space.

5. The fluid sterilization device according to claim 2, wherein the internal space is filled with a sealing member, and the sealing member is a material that transmits the ultraviolet ray and has higher thermal conductivity than air.

6. The fluid sterilization device according to claim 4, wherein the internal space is filled with a sealing member, and the sealing member is a material that transmits the ultraviolet ray and has higher thermal conductivity than air.

7. The fluid sterilization device according to claim 2, wherein the light source unit further includes a seal portion that covers the mounting substrate and does not cover the lid portion, and a light source case that accommodates the mounting substrate and the LED package and has an opening through which at least the LED package is exposed, the seal portion is formed of a polymer material containing thermally conductive particles or thermally conductive fibers, is in contact with the package case, and is in contact with an inner surface of the light source case, and the light source case is disposed in contact with the channel space and is configured to conduct heat of the light emitting element conducted through the package case and the seal portion to the fluid flowing through the channel space.

8. The fluid sterilization device according to claim 1, further comprising a channel tube formed in a tubular shape and having an inside serving as the channel space, wherein the light source unit is disposed at one end of the channel tube in an axial direction to close the one end of the channel tube in the axial direction.

9. The fluid sterilization device according to claim 1, further comprising a channel tube formed in a tubular shape and having an inside serving as the channel space, wherein the light source unit includes a through hole disposed at one end of the channel tube in an axial direction, the through hole through which the fluid flows between the channel tube side and a side opposite to the channel tube.

10. The fluid sterilization device according to claim 1, further comprising a channel tube formed in a tubular shape and having an inside serving as the channel space, wherein a through hole is provided in a side surface of the channel tube, and the light source unit is fitted into the through hole.

11. The fluid sterilization device according to claim 1, further comprising a channel tube including the channel space; and a reflective material formed around the channel tube.

12. The fluid sterilization device according to claim 2, wherein the package case comprises a ceramic material or a metal.

13. The fluid sterilization device according to claim 1, wherein the lid portion of the LED package is in direct contact the fluid flowing through the channel space.

14. The fluid sterilization device according to claim 1, further comprising a channel tube that is formed in a tubular shape and has an inside serving as the channel space, and the light source unit is disposed at one end of the channel tube in the axial direction.

15. The fluid sterilization device according to claim 1, further comprises a channel tube that is formed in a tubular shape and has an inside serving as the channel space, and the light source unit comprises a through hole disposed at one end of the channel tube in the axial direction through which the fluid flows between a channel tube side and a side opposite to the channel tube.

16. The fluid sterilization device according to claim 15, wherein the through hole is disposed in a side surface of the channel tube, and the light source unit is fit into the through hole.

17. The fluid sterilization device according to claim 2, wherein the lid portion and a side surface of the package case is in direct contact with the fluid in the channel space.

18. The fluid sterilization device according to claim 2, wherein the package case is formed of a material having a thermal conductivity higher than the thermal conductivity of the mounting substrate.

19. A fluid sterilization device comprising:

a light source apparatus configured to emit an ultraviolet ray; and a channel tube including a channel space that the ultraviolet ray from the light source unit enters, the channel space being a space through which a fluid flows, wherein the light source apparatus includes a mounting substrate, and an LED package mounted on the mounting substrate, the LED package includes a light emitting element configured to emit the ultraviolet ray, a package case accommodating the light emitting element, and a lid portion transmitting the ultraviolet ray from the light emitting element, disposed in contact with the channel space, and configured to conduct heat conducted from the light emitting element to a fluid flowing through the channel space, wherein the lid portion and the package case are exposed to the channel space, and wherein the channel tube includes an inlet at one end in an axial direction and an outlet on a side surface of the channel tube at another end surface of the channel tube and adjacent to the lid portion.

20. The fluid sterilization device according to claim 19, wherein the LED package includes the package case including an internal space and an opening portion through which the internal space opens, the package case accommodating the light emitting element in the internal space, having a bottom surface side mounted on the mounting substrate, and being configured to conduct heat generated from the light emitting element to the opening side, the lid portion seals the opening portion of the package case, and heat from the light emitting element is conducted to the lid portion through the package case.

* * * * *